(12) United States Patent
Chen

(10) Patent No.: US 12,524,436 B2
(45) Date of Patent: Jan. 13, 2026

(54) DATA TRANSMISSION METHOD, ELECTRONIC DEVICE, AND COMPUTER READABLE STORAGE MEDIUM

(71) Applicant: HUAWEI TECHNOLOGIES CO., LTD., Guangdong (CN)

(72) Inventor: Gang Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 18/564,610

(22) PCT Filed: Mar. 31, 2022

(86) PCT No.: PCT/CN2022/084522
§ 371 (c)(1),
(2) Date: Nov. 27, 2023

(87) PCT Pub. No.: WO2022/252791
PCT Pub. Date: Dec. 8, 2022

(65) Prior Publication Data
US 2024/0256567 A1    Aug. 1, 2024

(30) Foreign Application Priority Data
May 31, 2021   (CN) .......................... 202110604841.3

(51) Int. Cl.
*G06F 16/27* (2019.01)
*G06F 16/23* (2019.01)
(Continued)

(52) U.S. Cl.
CPC .......... *G06F 16/27* (2019.01); *G06F 16/2365* (2019.01); *G06F 16/2455* (2019.01); *G06F 16/256* (2019.01)

(58) Field of Classification Search
CPC .... G06F 16/27; G06F 16/2455; G06F 16/256; G06F 16/2365
(Continued)

(56) References Cited

U.S. PATENT DOCUMENTS 6,577,714 B1 * 6/2003 Darcie .................... H04L 67/52
                                                             379/93.17
6,999,968 B1 * 2/2006 Parkin ................. G06F 16/2456
(Continued)

FOREIGN PATENT DOCUMENTS

CN     107491510 A     12/2017
CN     109388620 A     2/2019
(Continued)

OTHER PUBLICATIONS

New Vision of Programs, "Application of Merkle tree in blockchain", URL: https://blog.csdn.net/wo541075754/article/details/54668121, Posted on Jan. 22, 2017, with the English translation, total 6 pages.

*Primary Examiner* — Hanh B Thai
(74) *Attorney, Agent, or Firm* — WOMBLE BOND DICKINSON (US) LLP

(57) ABSTRACT

A method includes: A second electronic device receives a first event from a first electronic device, where the first event includes first database version information; creates a first empty mapping database of a first source database based on the first database version information, where the first source database is a local database of the second electronic device; virtualizes the first source database and the first empty mapping database to obtain a first virtual database; performs data mapping in the first virtual database to map data in the first source database to the first empty mapping database, to obtain a first database in which data mapping is completed;
(Continued)

obtains a first mapping database based on the first database; and sends the first mapping database to the first electronic device.

20 Claims, 26 Drawing Sheets

(51) Int. Cl.
  *G06F 16/2455* (2019.01)
  *G06F 16/25* (2019.01)
(58) Field of Classification Search
  USPC .......................................................... 707/637
  See application file for complete search history.

(56) References Cited

U.S. PATENT DOCUMENTS

| | | | | |
|---|---|---|---|---|
| 7,222,141 | B2* | 5/2007 | Zondervan | G06F 16/275 |
| 7,313,561 | B2* | 12/2007 | Lo | G06F 16/289 |
| | | | | 707/999.102 |
| 9,075,635 | B1* | 7/2015 | Baird | G06F 9/44521 |
| 9,613,120 | B1* | 4/2017 | Kharatishvili | G06F 16/2358 |
| 10,534,629 | B1* | 1/2020 | St. Pierre | G06F 9/5055 |
| 10,649,852 | B1* | 5/2020 | Starling | G06F 11/1469 |
| 11,061,929 | B2* | 7/2021 | Xu | G06F 9/547 |
| 11,165,634 | B2* | 11/2021 | Medam | H04L 63/10 |
| 11,176,167 | B2* | 11/2021 | Lee | G06F 16/2228 |
| 11,527,239 | B2* | 12/2022 | Miller | H04N 21/44226 |
| 2001/0044805 | A1* | 11/2001 | Multer | G06F 16/182 |
| 2002/0188584 | A1* | 12/2002 | Ghannam | G06F 16/27 |
| 2004/0054711 | A1* | 3/2004 | Multer | H04L 67/1095 |
| | | | | 709/201 |
| 2005/0099963 | A1* | 5/2005 | Multer | G06F 16/178 |
| | | | | 370/254 |
| 2005/0209876 | A1* | 9/2005 | Kennis | G06Q 10/06393 |
| | | | | 726/1 |
| 2006/0136127 | A1* | 6/2006 | Coch | H04L 67/10 |
| | | | | 701/468 |
| 2006/0173873 | A1* | 8/2006 | Prompt | G06F 16/284 |
| 2006/0212487 | A1* | 9/2006 | Kennis | G06Q 40/00 |
| 2007/0260628 | A1* | 11/2007 | Fuchs | G06F 16/29 |
| 2008/0215524 | A1* | 9/2008 | Fuchs | G06F 16/29 |
| 2009/0030957 | A1* | 1/2009 | Manjunath | G06F 16/188 |
| 2009/0055464 | A1* | 2/2009 | Multer | H04L 67/1095 |
| | | | | 709/201 |
| 2009/0063559 | A1* | 3/2009 | Rhodes | G06F 16/258 |
| 2011/0126047 | A1* | 5/2011 | Anderson | H04L 63/08 |
| | | | | 709/224 |
| 2011/0126197 | A1* | 5/2011 | Larsen | G06F 21/31 |
| | | | | 718/1 |
| 2011/0126275 | A1* | 5/2011 | Anderson | H04L 63/14 |
| | | | | 726/8 |
| 2011/0269424 | A1* | 11/2011 | Multer | H04L 67/1095 |
| | | | | 455/411 |
| 2012/0079095 | A1* | 3/2012 | Evans | H04L 67/1095 |
| | | | | 709/224 |
| 2012/0254263 | A1* | 10/2012 | Hiestermann | G01C 21/3844 |
| | | | | 707/812 |
| 2013/0144566 | A1* | 6/2013 | De Biswas | G06F 30/00 |
| | | | | 703/1 |
| 2013/0282662 | A1* | 10/2013 | Kumarasamy | G06F 3/0689 |
| | | | | 707/649 |
| 2014/0115252 | A1* | 4/2014 | Yu | G06F 3/067 |
| | | | | 711/113 |
| 2015/0227533 | A1* | 8/2015 | Goldstein | G06F 16/2379 |
| | | | | 707/661 |
| 2016/0127465 | A1* | 5/2016 | Barstow | H04L 41/5019 |
| | | | | 707/620 |
| 2017/0059330 | A1* | 3/2017 | Pfeifle | G01C 21/3881 |
| 2018/0165348 | A1* | 6/2018 | Cole | G06F 16/283 |
| 2018/0329967 | A1* | 11/2018 | Lee | G06F 16/27 |
| 2018/0349270 | A1* | 12/2018 | Mittal | G06F 3/065 |
| 2019/0243671 | A1* | 8/2019 | Yadav | G06F 9/45533 |
| 2019/0332595 | A1* | 10/2019 | Palmer | G06F 16/273 |
| 2019/0361997 | A1* | 11/2019 | Thallam Kodandaramaih | |
| | | | | G06F 16/122 |
| 2019/0377889 | A1* | 12/2019 | Mertens | G06F 21/60 |
| 2020/0035020 | A1* | 1/2020 | Price | G06T 5/50 |
| 2020/0285912 | A1* | 9/2020 | Brebner | G06V 30/19173 |
| 2021/0133160 | A1* | 5/2021 | Craft | G06F 16/148 |
| 2021/0150837 | A1* | 5/2021 | Johnson | G06Q 10/02 |
| 2021/0157513 | A1* | 5/2021 | Wang | G06F 3/065 |
| 2021/0314419 | A1* | 10/2021 | Leung | G06F 9/5072 |
| 2022/0179845 | A1* | 6/2022 | Shats | G06F 16/2379 |
| 2022/0253427 | A1* | 8/2022 | Palmer | G06F 16/2315 |
| 2022/0309010 | A1* | 9/2022 | Jiang | G06F 13/4004 |
| 2022/0342900 | A1* | 10/2022 | Basu | G06N 20/00 |
| 2023/0020330 | A1* | 1/2023 | Schwerin | G06F 16/256 |
| 2023/0083893 | A1* | 3/2023 | Craft | H04L 51/52 |
| | | | | 707/769 |
| 2023/0171163 | A1* | 6/2023 | Gudipati | H04L 41/0836 |
| 2024/0036929 | A1* | 2/2024 | Moyes | G06F 9/5072 |

FOREIGN PATENT DOCUMENTS

| | | |
|---|---|---|
| CN | 111159177 A | 5/2020 |
| WO | 2021055016 A1 | 3/2021 |

* cited by examiner

DATA TRANSMISSION METHOD, ELECTRONIC DEVICE, AND COMPUTER READABLE STORAGE MEDIUM

CROSS-REFERENCE TO RELATED APPLICATIONS

This application is a National Stage of International Application No. PCT/CN2022/084522 filed on Mar. 31, 2022, which claims priority to Chinese Patent Application No. 202110604841.3, filed on May 31, 2021, both of which are hereby incorporated by reference in their entireties.

TECHNICAL FIELD

This application relates to the field of data processing technologies, and in particular, to a data transmission method, an electronic device, and a computer-readable storage medium.

BACKGROUND

An electronic device may synchronize local data to another electronic device through data synchronization. Currently, in a data synchronization process, data is synchronized piece by piece, and data format conversion is involved in a read/write process. This is time-consuming, causing a low data synchronization speed.

In other words, a data synchronization speed in the conventional technology is low.

SUMMARY

Embodiments of this application provide a data transmission method, an electronic device, and a computer-readable storage medium that may improve a data synchronization speed.

According to a first aspect, an embodiment of this application provides a cross-device data transmission method applied to a second electronic device. The method includes: receiving a first event from a first electronic device, where the first event includes first database version information, the first database version information describes a database version of a second source database, and the second source database is a local database of the first electronic device: creating a first empty mapping database of a first source database based on the first database version information, where the first source database is a local database of the second electronic device; virtualizing the first source database and the first empty mapping database to obtain a first virtual database: performing data mapping in the first virtual database to map data in the first source database to the first empty mapping database, to obtain a first database in which data mapping is completed: obtaining a first mapping database based on the first database; and sending the first mapping database to the first electronic device.

It can be learned that, in this embodiment of this application, a database is mapped to a peer device as a whole, so that database-level data synchronization is implemented, and data format conversion is not involved. This reduces time consumed for data synchronization, improves a data synchronization speed, and enables a higher data availability speed.

In some possible embodiments of the first aspect, the obtaining a first mapping database based on the first database includes:

comparing a database version of the first source database with the database version of the second source database based on the first database version information and second database version information, where the second database version information describes the database version of the first source database; and if the version of the first source database is later than the version of the second source database, performing a version rollback on the first database to obtain the first mapping database, where a version of the first mapping database is consistent with the version of the second source database; or if the version of the first source database is earlier than or equal to the version of the second source database, using the first database as the first mapping database, where a version of the first mapping database is consistent with the version of the first source database.

Further, when the two electronic devices have different database versions and different data table structures, in this embodiment of this application, a version rollback is correspondingly performed based on the database versions of the two electronic devices, so that a database-level synchronization method in this embodiment of this application is applicable to a wider application range.

In some possible embodiments of the first aspect, when a version of the first source database is later than the version of the second source database, a version of the first empty mapping database is consistent with the version of the first source database, and a table structure of the first empty mapping database is consistent with a table structure of the second source database; or when a version of the first source database is earlier than the version of the second source database, a version of the first empty mapping database is consistent with the version of the first source database, and a table structure of the first empty mapping database is consistent with a table structure of the first source database.

In some possible embodiments of the first aspect, the method further includes:

sending a second event to the first electronic device, where the second event includes the second database version information; and receiving a second mapping database from the first electronic device, where the second mapping database is a mapping database that is of the second source database and that is created by the first electronic device based on the second database version information.

In this embodiment, both the first electronic device and the second electronic device may synchronize a local database to a peer device as a whole.

In some possible embodiments of the first aspect, after the receiving a second mapping database from the first electronic device, the method further includes:

if the version of the first source database is earlier than the version of the second source database, virtualizing the second mapping database and the first source database to obtain a second virtual database; or if the version of the first source database is later than the version of the second source database, upgrading the second mapping database to obtain an upgraded second mapping database, where a version of the upgraded second mapping database is consistent with the version of the first source database; and virtualizing the upgraded second mapping database and the first source database to obtain a second virtual database.

In this embodiment, on the basis of virtualizing the first source database and the second mapping database to obtain one virtual database, data in the two databases does not need to be synchronized piece by piece, thereby further improving a data synchronization speed. The second virtual database includes the first source database and the second mapping database that are independent of each other.

In addition, the two databases are virtualized into one virtual database, so that subsequent cross-device data convergence access may be facilitated.

In some possible embodiments of the first aspect, after the virtualizing the second mapping database and the first source database to obtain a second virtual database, the method further includes:
  obtaining a first data access request of a first application, where the second electronic device includes the first application; and
  if the first data access request includes a device identifier of the first electronic device, querying the second mapping database in the second virtual database to obtain a first query result, and returning the first query result to the first application;
  if the first data access request does not include a device identifier, querying the second mapping database and the first source database in the second virtual database to obtain a second query result, and returning the second query result to the first application; or
  if the first data access request includes a device identifier of the second electronic device, querying the first source database in the second virtual database to obtain a third query result, and returning the third query result to the first application.

In this embodiment, the second electronic device premaps a local database of the first electronic device to local storage space, so that access to data of the first electronic device may be similar to access to the local database. In some embodiments, cross-device data access that is similar to local database access is provided. In addition, when the data of the first electronic device is accessed, a process from initiating an access request to obtaining a query result does not need to involve a process of linking to a remote database, a process of data backhaul of a remote database, or the like. A query speed is not affected by network transmission quality, and time consumed is short, so that performance of cross-device data access is high. In addition, the second electronic device virtualizes a local database and a mapping database of a peer device into one database, and queries and filters data of a plurality of devices based on one query request, thereby implementing cross-device data convergence access.

Further, during data synchronization, a manner in which a database is mapped to a peer device as a whole is used. This reduces time consumed for data synchronization, improves a data availability speed, and further improves performance of data convergence access.

In some possible embodiments of the first aspect, after the second electronic device receives a second mapping database from the first electronic device, the method further includes:
  receiving a first change script from the first electronic device, where the first change script includes a table for recording change data of the second source database; and
  if the version of the first source database is later than the version of the second source database, upgrading the first change script to obtain an upgraded first change script, where a table structure of the upgraded first change script is consistent with the table structure of the first source database; and
  loading the change data of the second source database into the second mapping database by executing the upgraded first change script; or
  if the version of the first source database is earlier than the version of the second source database, loading the change data of the second source database into the second mapping database by executing the first change script.

In some possible embodiments of the first aspect, the method further includes:
  determining, based on a first data state tree, whether the data in the first source database changes, where the first data state tree describes a state of data that is in the first source database and that is mapped to the first empty mapping database;
  if the data in the first source database changes, recording the change data in the first source database in a second change script, where the second change script includes a table for recording change data; and
  sending the second change script to the first electronic device, where when the version of the first source database is later than the version of the second source database, a table structure of the second change script is consistent with the table structure of the second source database; or
  when the version of the first source database is earlier than the version of the second source database, a table structure of the second change script is consistent with the table structure of the first source database.

In this embodiment, data state information is recorded during data mapping, and data is monitored in real time based on the data state information to see whether the data changes. When the data changes, change data is synchronized to a peer device based on the data state information, so that cross-device data state management may be implemented, and cross-device real-time data query is implemented.

In some possible embodiments of the first aspect, after determining that the data in the first source database changes, the method further includes:
  updating the first data state tree.

According to a second aspect, an embodiment of this application provides a cross-device data transmission method applied to a first electronic device. The method includes:
  sending a first event to a second electronic device, where the first event includes first database version information, the first database version information describes a database version of a second source database, and the second source database is a local database of the first electronic device; and
  receiving a first mapping database from the second electronic device, where the first mapping database is a mapping database that is of a first source database and that is created by the second electronic device based on the first database version information, and the first source database is a local database of the second electronic device.

In some possible embodiments of the second aspect, after the receiving a first mapping database from the second electronic device, the method further includes:
  if a version of the first source database is later than the version of the second source database, virtualizing the first mapping database and the second source database to obtain a third virtual database; or if a version of the first source database is earlier than the version of the second source database, upgrading the first mapping database to obtain an upgraded first mapping database, where a version of the upgraded first mapping database is consistent with the version of the second source database; and virtualizing the upgraded first mapping database and the second source database to obtain a third virtual database.

In some possible embodiments of the second aspect, after obtaining the third virtual database, the method further includes:

obtaining a second data access request of a second application, where the first electronic device includes the second application; and if the second data access request includes a device identifier of the first electronic device, querying the second source database in the third virtual database to obtain a fourth query result, and returning the fourth query result to the second application;

if the second data access request does not include a device identifier, querying the first mapping database and the second source database in the third virtual database to obtain a fifth query result, and returning the fifth query result to the second application; or if the second data access request includes a device identifier of the second electronic device, querying the first mapping database in the third virtual database to obtain a sixth query result, and returning the sixth query result to the second application.

In some possible embodiments of the second aspect, after the receiving a first mapping database from the second electronic device, the method further includes:

receiving a second change script from the second electronic device, where the second change script includes a table for recording change data of the first source database;

if a version of the first source database is earlier than the version of the second source database, upgrading the second change script to obtain an upgraded second change script, where a table structure of the upgraded second change script is consistent with a table structure of the second source database; and loading the change data of the first source database into the first mapping database by executing the upgraded second change script; or if a version of the first source database is later than the version of the second source database, loading the change data of the first source database into the first mapping database by executing the second change script.

In some possible embodiments of the second aspect, the method further includes:

receiving a second event from the second electronic device, where the second event includes second database version information, and the second database version information describes a database version of the first source database;

creating a second empty mapping database of the second source database based on the second database version information;

virtualizing the second source database and the second empty mapping database to obtain a fourth virtual database;

performing data mapping in the fourth virtual database to map data in the second source database to the second empty mapping database, to obtain a second database in which data mapping is completed;

obtaining a second mapping database based on the second database; and sending the second mapping database to the second electronic device.

In some possible embodiments of the second aspect, the obtaining a second mapping database based on the second database includes:

comparing the database version of the first source database with the database version of the second source database based on the first database version information and the second database version information; and if the version of the first source database is earlier than or equal to the version of the second source database, performing a version rollback on the second database to obtain the second mapping database, where a version of the second mapping database is consistent with the version of the first source database; or if the version of the first source database is later than the version of the second source database, using the second database as the first mapping database, where a version of the second mapping database is consistent with the version of the second source database.

In some possible embodiments of the second aspect, when the version of the first source database is earlier than the version of the second source database, a version of the second empty mapping database is consistent with the version of the second source database, and a table structure of the second empty mapping database is consistent with a table structure of the first source database; or when the version of the first source database is later than the version of the second source database, a version of the second empty mapping database is consistent with the version of the second source database, and a table structure of the second empty mapping database is consistent with the table structure of the second source database.

In some possible embodiments of the second aspect, after the sending the first mapping database to the first electronic device, the method further includes:

determining, based on a second data state tree, whether the data in the second source database changes, where the second data state tree describes a state of data that is in the second source database and that is mapped to the second empty mapping database;

if the data in the second source database changes, recording change data in the second source database in a first change script, where the first change script includes a table for recording change data;

updating the second data state tree; and sending the first change script to the second electronic device, where when the version of the first source database is earlier than the version of the second source database, a table structure of the first change script is consistent with a table structure of the first source database; or when the version of the first source database is later than the version of the second source database, a table structure of the first change script is consistent with the table structure of the second source database.

According to a third aspect, an embodiment of this application provides an electronic device, including a memory, a processor, and a computer program that is stored in the memory and that may be run on the processor. When the processor executes the computer program, the method according to any one of the first aspect or the second aspect is implemented.

According to a fourth aspect, an embodiment of this application provides a computer-readable storage medium. The computer-readable storage medium stores a computer program, and when the computer program is executed by a processor, the method according to any one of the first aspect or the second aspect is implemented.

According to a fifth aspect, an embodiment of this application provides a chip system. The chip system includes a processor, and the processor is coupled to a memory. The processor executes a computer program stored in the memory, to implement the method according to any one of the first aspect or the second aspect. The chip system may be a single chip or a chip module including a plurality of chips.

According to a sixth aspect, an embodiment of this application provides a computer program product. When the computer program product runs on an electronic device, the electronic device is enabled to perform the method according to any one of the first aspect or the second aspect.

It may be understood that, for beneficial effects of the second aspect to the sixth aspect, refer to related descriptions in the first aspect. Details are not described herein.

DESCRIPTION OF EMBODIMENTS

In the following descriptions, for illustration instead of limitation, specific details such as a particular system structure and a technology are provided to make a thorough understanding of embodiments of this application.

The following first describes, by using an example, a system architecture and an application scenario that may be involved in an embodiment of this application.

Figure 1:
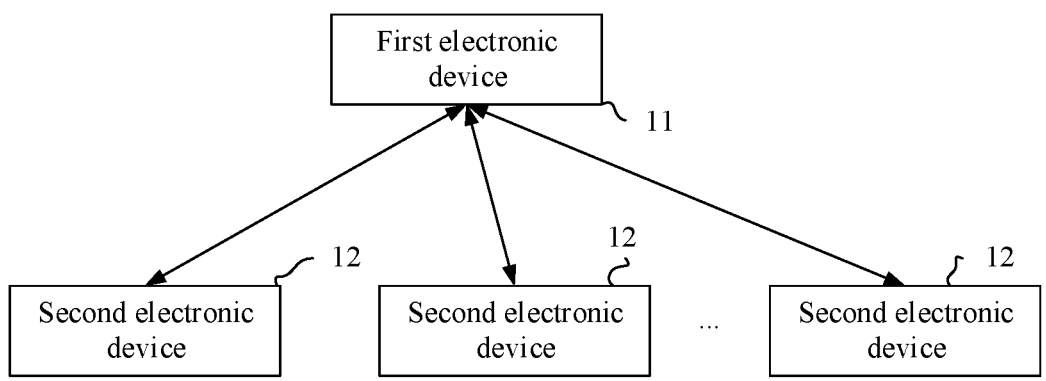
FIG. 1 is a block diagram of a system architecture according to an embodiment of this application.

FIG. 1 is a block diagram of the system architecture according to this embodiment of this application. The system may include a first electronic device 11 and at least one second electronic device 12. The first electronic device 11 and the second electronic device 12 can communicate with each other through a communication connection. The communication connection between the first electronic device 11 and the second electronic device 12 may be a short-range communication connection, for example, a Wi-Fi point-to-point connection or a Bluetooth connection, or may be a long-range communication connection, for example, an Internet connection. A type of the communication connection is not limited herein.

The first electronic device 11 may be a terminal device such as a mobile phone, a tablet computer, or a notebook computer, or may be a non-terminal device such as a server. Similarly, the second electronic device 12 may be a terminal device such as a mobile phone, a tablet computer, or a notebook computer, or may be a non-terminal device such as a server. Device types of the first electronic device 11 and the second electronic device 12 are not limited in this embodiment of this application.

Figure 2:
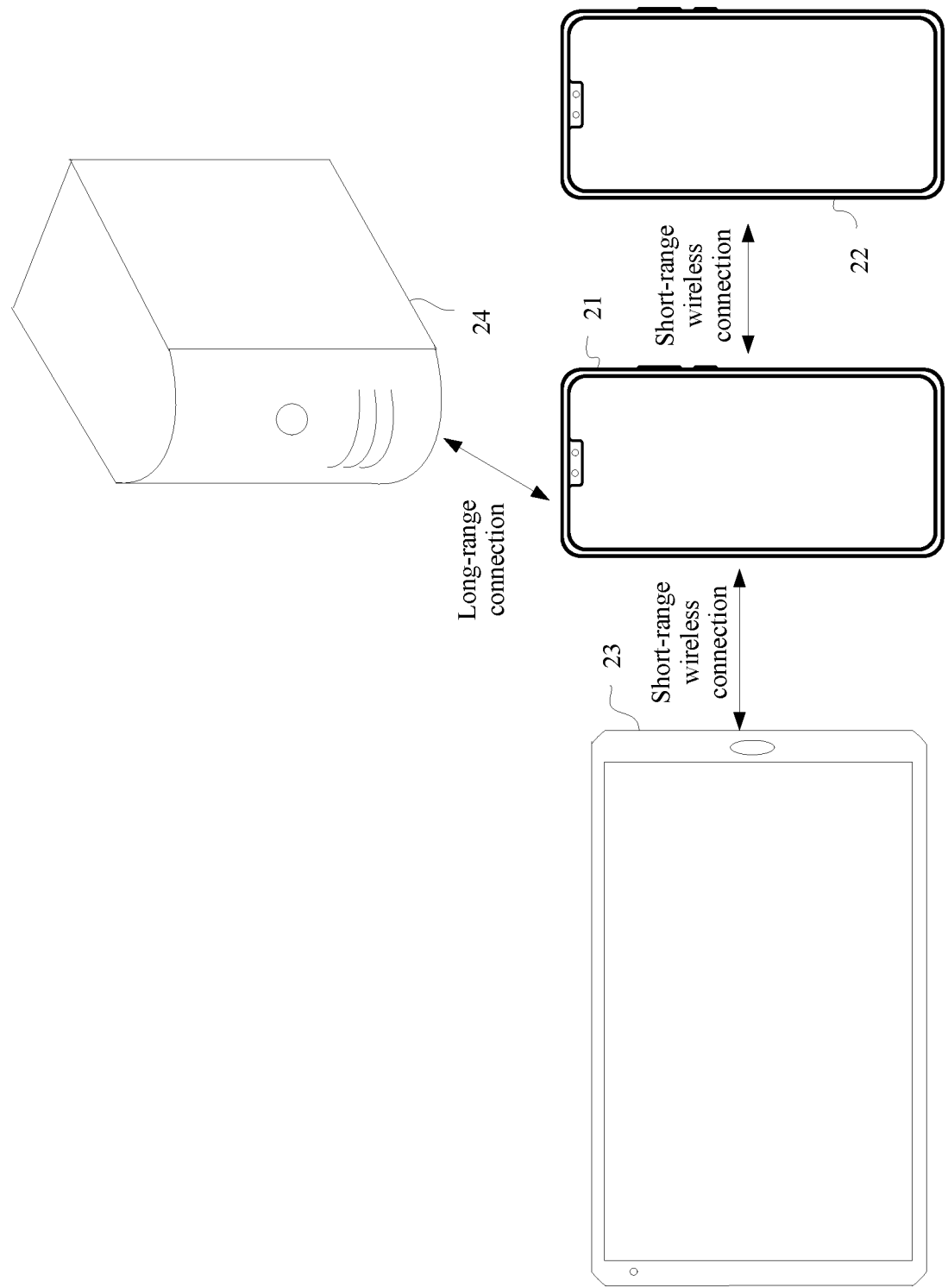
FIG. 2 is a diagram of a system architecture according to an embodiment of this application.

For example, FIG. 2 is a diagram of the system architecture according to this embodiment of this application. The system includes a mobile phone 21, a mobile phone 22, a tablet 23, and a cloud server 24. In this case, the first electronic device is the mobile phone 21, and the second electronic device includes the mobile phone 22, the tablet 23, and the cloud server 24.

A communication connection between the mobile phone 21 and the mobile phone 22 may be a Wi-Fi point-to-point connection, a communication connection between the mobile phone 21 and the tablet 23 may be a Wi-Fi point-to-point connection, and a communication connection between the mobile phone 21 and the cloud server 24 may be an Internet connection.

Based on the communication connection between the first electronic device 11 and the second electronic device 12, the first electronic device 11 may map data of the second electronic device 12 to local storage space. In this way, the first electronic device 11 may access the data of the second electronic device 12 in the local storage space, thereby implementing cross-device data convergence access. Similarly, the second electronic device 12 may also map data of the first electronic device 11 to local storage space, to implement cross-device data convergence access.

The data convergence access means that filtering query, sorting query, and the like may be performed on data of a plurality of electronic devices based on one query request. For example, the first electronic device 11 maps a database of the second electronic device 12 to the local storage space, and virtualizes the database of the first electronic device 12 and the local database to obtain one virtual database. Based on the virtual database, with one query request, the first electronic device 11 may access the data of the first electronic device 11 and the data of the second electronic device 12 from the virtual database, and filter and sort the data of the two devices, to obtain a query result.

Data accessed across devices may be media data, for example, a video, audio, or a picture, or may be data of another type. A type of the data accessed across devices is not limited in this embodiment of this application.

For example, in a distributed gallery scenario, a user may browse or search, in a gallery of the mobile phone 21, for a picture stored in the mobile phone 22, the tablet 23, and any electronic device on the cloud server 24.

The following describes in detail a technical solution provided in this embodiment of this application.

The technical solution provided in an embodiment of this application may include a data mapping process, a data change monitoring process, and a data convergence access process.

Data mapping process (also referred to as a data transmission process):

In the data mapping process, in this embodiment of this application, a database or a database table is mapped to a peer device as a whole, to implement database-level or file-level data synchronization. Compared with a common data synchronization process, the data mapping process in this embodiment of this application may improve a data synchronization speed and a data availability speed.

In some embodiments, in the common data synchronization process, data is synchronized piece by piece, and data format conversion is involved in a read/write process. This is time-consuming, causing a low data synchronization speed. For example, to synchronize data of a second electronic device locally, a first electronic device reads the data of the second electronic device piece by piece, and writes the read data locally. Format conversion needs to be performed in the read/write process.

However, in the data mapping process in this embodiment of this application, database-level or file-level data synchronization is implemented, and data format conversion is not involved. This reduces a data synchronization time and improves a data synchronization speed, making a data availability speed higher.

For example, after the second electronic device is connected to a network, the data of the second electronic device is mapped to the first electronic device in an extremely short time through the data mapping process in this embodiment of this application. In this way, the data of the second electronic device may be used (for example, for querying) by the first electronic device. A data availability speed is high, and plug-and-play is implemented. In some embodiments, once the second electronic device goes online, the first electronic device may locally access the data of the second electronic device.

In addition, because the data mapping process in this embodiment of this application improves a data synchronization speed, performance of cross-device data convergence access is further improved.

To better describe the data mapping process, the following describes the data mapping process with reference to the accompanying drawings.

Figure 3:
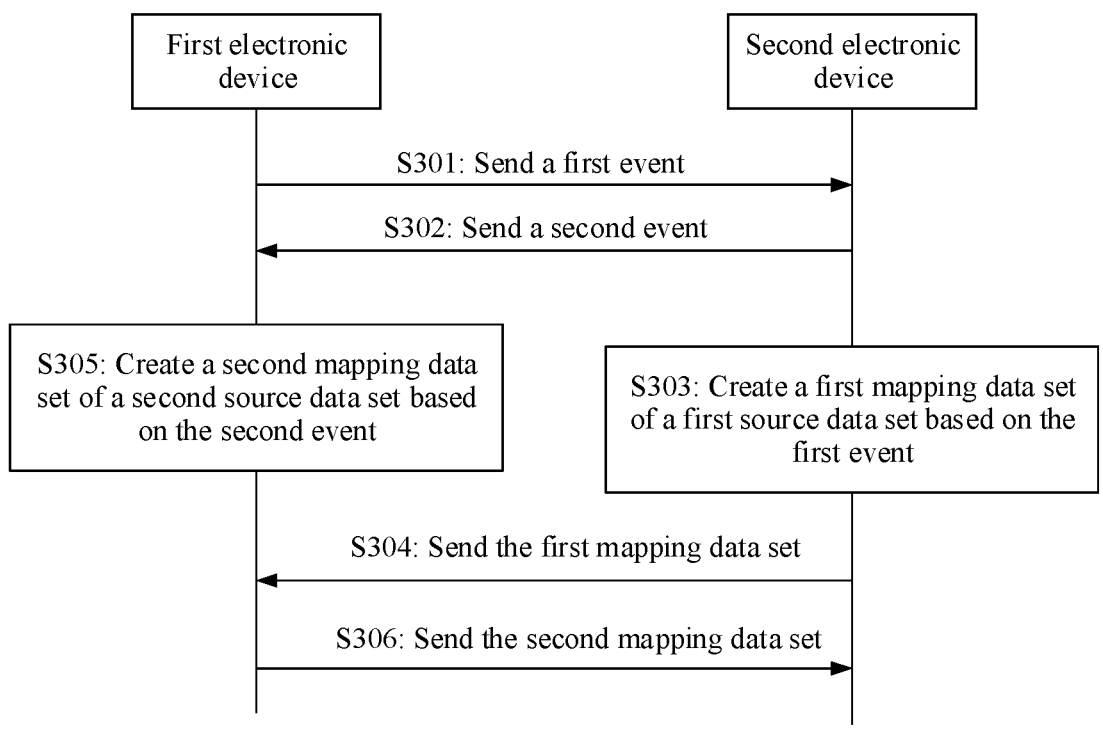
FIG. 3 is a block diagram of a procedure of a data mapping process according to an embodiment of this application.

FIG. 3 is a block diagram of a procedure of the data mapping process according to this embodiment of this application. The method may include the following operations.

Operation S301: The first electronic device sends a first event to the second electronic device.

The first event may include but is not limited to device information and database version information of the first electronic device. The device information of the first electronic device includes but is not limited to a device type, a device identifier, an Internet Protocol address (Internet Protocol Address, IP address), and the like. The database version information of the first electronic device describes information such as a version number (that is, version code) of a local database of the first electronic device.

In some embodiments, the first event may include the database version information. In some other embodiments, the first event may not include the database version information.

The first event may be represented as a device online event. In some embodiments, after the first electronic device and the second electronic device establish a communication connection, to map the data of the second electronic device locally, the first electronic device may send the device online event to the second electronic device. For example, after a mobile phone and a tablet establish a Wi-Fi point-to-point connection, to map data of the tablet to the mobile phone locally, the mobile phone sends the device online event to the tablet. Alternatively, when the mobile phone has been connected to a wireless router, after the tablet is connected to the same wireless router, the mobile phone sends the device online event to the tablet.

Certainly, the first event is not limited to the device online event, and may be another event that may have a same function. In addition, a time at which the first electronic device sends the first event is not limited to a time after a device goes online.

Operation S302: The second electronic device sends a second event to the first electronic device.

The second event may include but is not limited to device information and database version information of the second electronic device. The device information of the second electronic device includes but is not limited to a device type, a device identifier, an IP address, and the like. The database version information of the second electronic device describes information such as a version number of a local database of the second electronic device. In some cases, the second event may not include the database version information.

The second event may be represented as the device online event. In some embodiments, after the first electronic device and the second electronic device establish a communication connection, to map the data of the first electronic device locally, the second electronic device may send the device online event to the first electronic device. Certainly, the second event is not limited to the device online event, and may be an event of another type. In addition, a time at which the second electronic device sends the second event is not limited to a time after a device goes online.

It should be noted that an execution sequence of operation S301 and operation S302 may be random.

Operation S303: The second electronic device creates a first mapping data set of a first source data set based on the first event.

The first source data set means a local data set of the second electronic device, and may be specifically a database or a database table. When the first source data set is the database, the first mapping data set is correspondingly a mapping database of a local database. When the first source data set is the database table, the first mapping data set is correspondingly a mapping table of a local database table.

Operation S304: The second electronic device sends the first mapping data set to the first electronic device.

If the first mapping data set is the mapping database, after receiving the first mapping data set, the first electronic device may virtualize the first mapping data set and the local database into one virtual database, to facilitate subsequent data convergence access. Certainly, if data convergence access does not need to be performed, the first mapping data set and the local data set may not need to be virtualized into one virtual database.

If the first mapping data set is the mapping table, after receiving the first mapping data set, the first electronic device may load the first mapping data set into an intermediate result database.

After receiving the first mapping data set, the first electronic device may associate the device information of the second electronic device with the first mapping data set. In this way, the first mapping data set may be queried based on the device information of the second electronic device.

Operation S305: The first electronic device creates a second mapping data set of a second source data set based on the second event.

The second source data set means a local data set of the first electronic device, and may be a database or a database table. When the first source data set is a local database, the second mapping data set is a mapping database of the local database. When the first source data set is a local database table, the second mapping data set is a mapping table of the local database table.

Operation S306: The first electronic device sends the second mapping data set to the second electronic device.

If the second mapping data set is the mapping database, after receiving the second mapping data set, the second electronic device may virtualize the second mapping data set and the local database into one virtual database, to implement data convergence access. Certainly, if data convergence access does not need to be performed, the second mapping data set and the local data set may not need to be virtualized into one virtual database.

If the second mapping data set is the mapping table, after receiving the second mapping data set, the second electronic device may load the second mapping data set into the intermediate result database.

After receiving the second mapping data set, the second electronic device may associate the device information of the first electronic device with the second mapping data set. In this way, the second mapping data set may be queried based on the device information of the first electronic device.

FIG. 3 shows a process in which the second electronic device maps the local data set to the first electronic device. The process includes operation S301, operation S303, and operation S304. FIG. 3 further shows a process in which the first electronic device maps the local data set to the second electronic device. The process includes operation S302, operation S305, and operation S306. In other words, in some embodiments, the data mapping process in this embodiment of this application may include the process in which the second electronic device maps the local data set to the first electronic device, and the process in which the first electronic device maps the local data set to the second electronic device.

In some other embodiments, the data mapping process may include only the process in which the second electronic device maps the local data set to the first electronic device. In some embodiments, the first electronic device maps a data set of the second electronic device locally, and does not need to map the local data set to the second electronic device. Alternatively, the data mapping process may include only the process in which the first electronic device maps the local data set to the second electronic device.

It can be learned from the foregoing that, in this embodiment of this application, a database or a database table is mapped to a peer device as a whole, to implement database-level or file-level data synchronization. This reduces time consumed for data synchronization, increases a data availability speed, and further improves performance of cross-device data convergence access.

Based on different types of mapping data sets created by the first electronic device or the second electronic device, the data mapping process may be classified into a database mapping procedure or a table mapping procedure. When the mapping data set created by the first electronic device or the second electronic device is a mapping database, the data mapping process is a database mapping procedure, which is also referred to as a database mapping mode. When the mapping data set created by the first electronic device or the second electronic device is a mapping database table, the data mapping process is a table mapping procedure, which is also referred to as a table mapping mode. The following separately describes the two modes.

Figure 4:
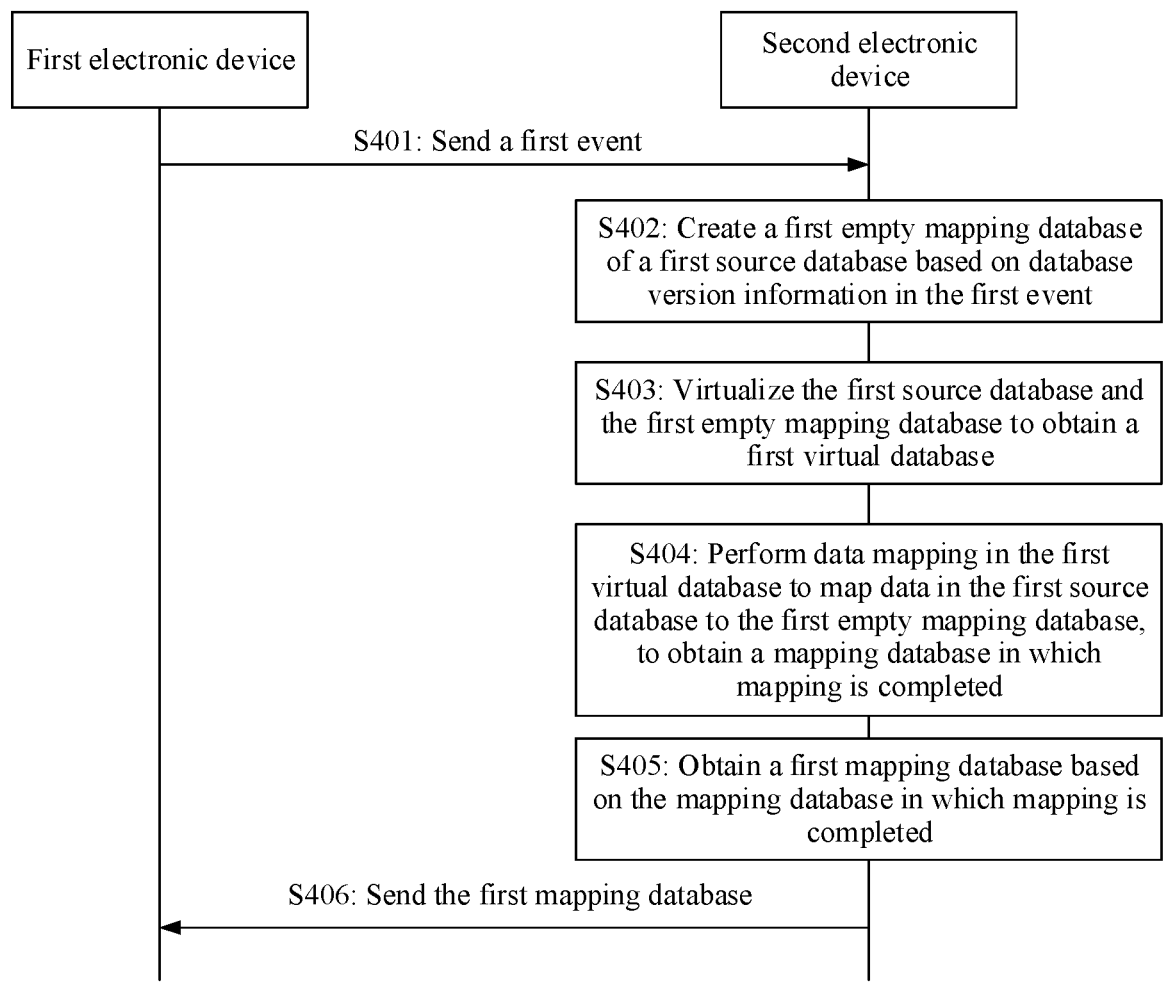
FIG. 4 is a diagram of a procedure of a database mapping mode according to an embodiment of this application.

Database Mapping Procedure:

FIG. 4 is a diagram of a procedure of the database mapping mode according to this embodiment of this application. The procedure may include the following operations.

Operation S401: The first electronic device sends the first event to the second electronic device.

Operation S402: The second electronic device creates a first empty mapping database of a first source database based on database version information in the first event.

In this case, the first source data set is the first source database, and the first source database is the local database of the second electronic device. The first empty mapping database means an empty database in which no data is loaded.

The second electronic device compares a database version of the first electronic device with a database version of the second electronic device based on the database version information in the first event.

If the database version of the first electronic device is later than the database version of the second electronic device, a version of the first empty mapping database is consistent with a version of the first source database, and a table structure of the first empty mapping database is consistent with a table structure of the first source database.

If the database version of the first electronic device is earlier than or equal to the database version of the second electronic device, a version of the first empty mapping database is consistent with a version of the first source database, and a table structure in the first empty mapping database is consistent with a table structure of the local database of the first electronic device. A database of a later version may know table structure information of a database of an earlier version. Therefore, the second electronic device may learn table structure information of a database of the first electronic device.

Operation S403: The second electronic device virtualizes the first source database and the first empty mapping database to obtain a first virtual database.

Operation S404: The second electronic device performs data mapping in the first virtual database to map data in the first source database to the first empty mapping database, to obtain a mapping database in which mapping is completed.

If the database version of the first electronic device is earlier than or equal to the database version of the second electronic device, the table structure in the first empty mapping database is consistent with the table structure of the local database of the first electronic device. Therefore, data is filtered based on the table structure of the local database of the first electronic device during data mapping.

Operation S405: The second electronic device obtains a first mapping database based on the mapping database in which mapping is completed. In this case, the first mapping data set is the first mapping database.

If the database version of the first electronic device is later than the database version of the second electronic device, the second electronic device uses the mapping database in which mapping is completed as the first mapping data set.

If the database version of the first electronic device is earlier than the database version of the second electronic device, the second electronic device performs a database version rollback on the mapping database in which mapping is completed to obtain the first mapping database. A version of the first mapping database is consistent with a version of the local database of the first electronic device.

Operation S406: The first electronic device receives the first mapping database from the second electronic device.

If the database version of the first electronic device is earlier than or equal to the database version of the second electronic device, the version of the first mapping database is consistent with the version of the local database of the first electronic device, and the table structure of the first mapping database is also consistent with the table structure of the local database of the first electronic device. In this case, after receiving the first mapping database, the first electronic device may virtualize the first mapping database and the local database to obtain a third virtual database.

If the database version of the first electronic device is later than the database version of the second electronic device, the version of the first mapping database is consistent with the version of the first source database of the second electronic device, and the table structure of the first mapping database is also consistent with the table structure of the first source database of the second electronic device. In this case, the first electronic device needs to upgrade the version of the first mapping database to obtain a mapping database after version upgrade. A version of the mapping database after version upgrade is consistent with the version of the local database of the first electronic device, and a table structure of the mapping database after version upgrade is also consistent with the table structure of the local database of the first electronic device. After the version upgrade is completed, the first electronic device virtualizes the mapping database after version upgrade and the local database to obtain the third virtual database.

Based on the third virtual database, the first electronic device may access the data of the second electronic device in a cross-device and converged manner.

After receiving the first mapping database, the first electronic device may associate the device information of the second electronic device with the first mapping database.

It should be noted that, the mapping database and the local source database are virtualized to obtain one virtual database, so that data convergence can be implemented without data being converged piece by piece. In addition, this aims to implement subsequent data convergence access. In some embodiments, data of a plurality of electronic devices can be queried and filtered from one database based on one query request. Certainly, in some other embodiments, the operation of virtualizing the mapping database and a local source database may not be performed.

It should be further noted that the first mapping database and the first virtual database in the second electronic device temporarily exist. In some embodiments, after sending the first mapping database to the first electronic device, the second electronic device may clear the first mapping database from a local cache. Similarly, after a database version rollback is performed on the mapping database in which mapping is completed, the second electronic device may also clear the mapping database in which mapping is completed from a local cache. After mapping the data in the first source database to the first empty mapping database, the second electronic device may cancel the first virtual database.

It can be learned that, in the database mapping procedure, a database is mapped to a peer device as a whole. This reduces time consumed for data synchronization, improves a data availability speed, and improves performance of cross-device data convergence access.

Figure 5:
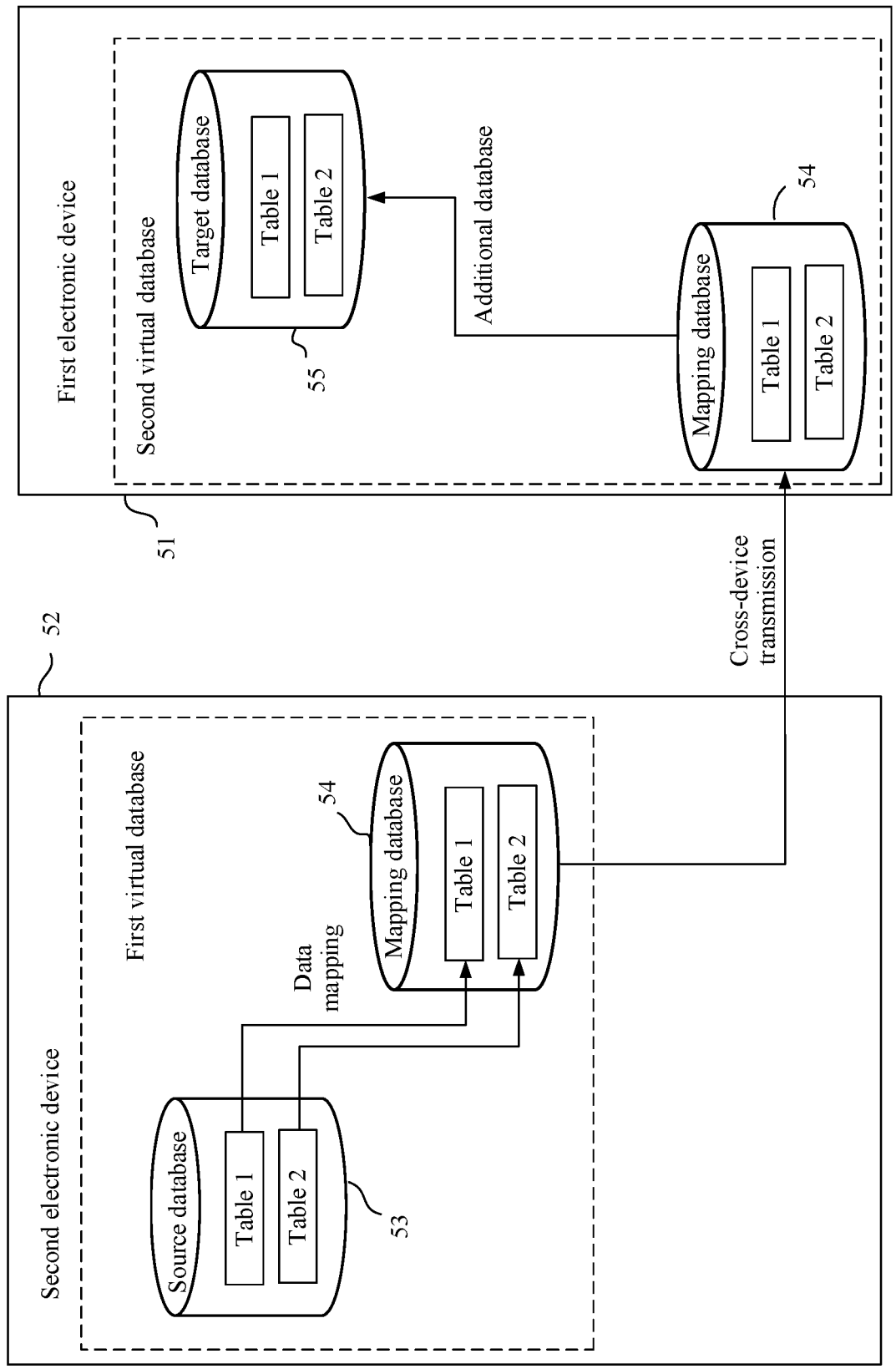
FIG. 5 is a diagram of database mapping when database versions are the same according to an embodiment of this application.
Figure 6:
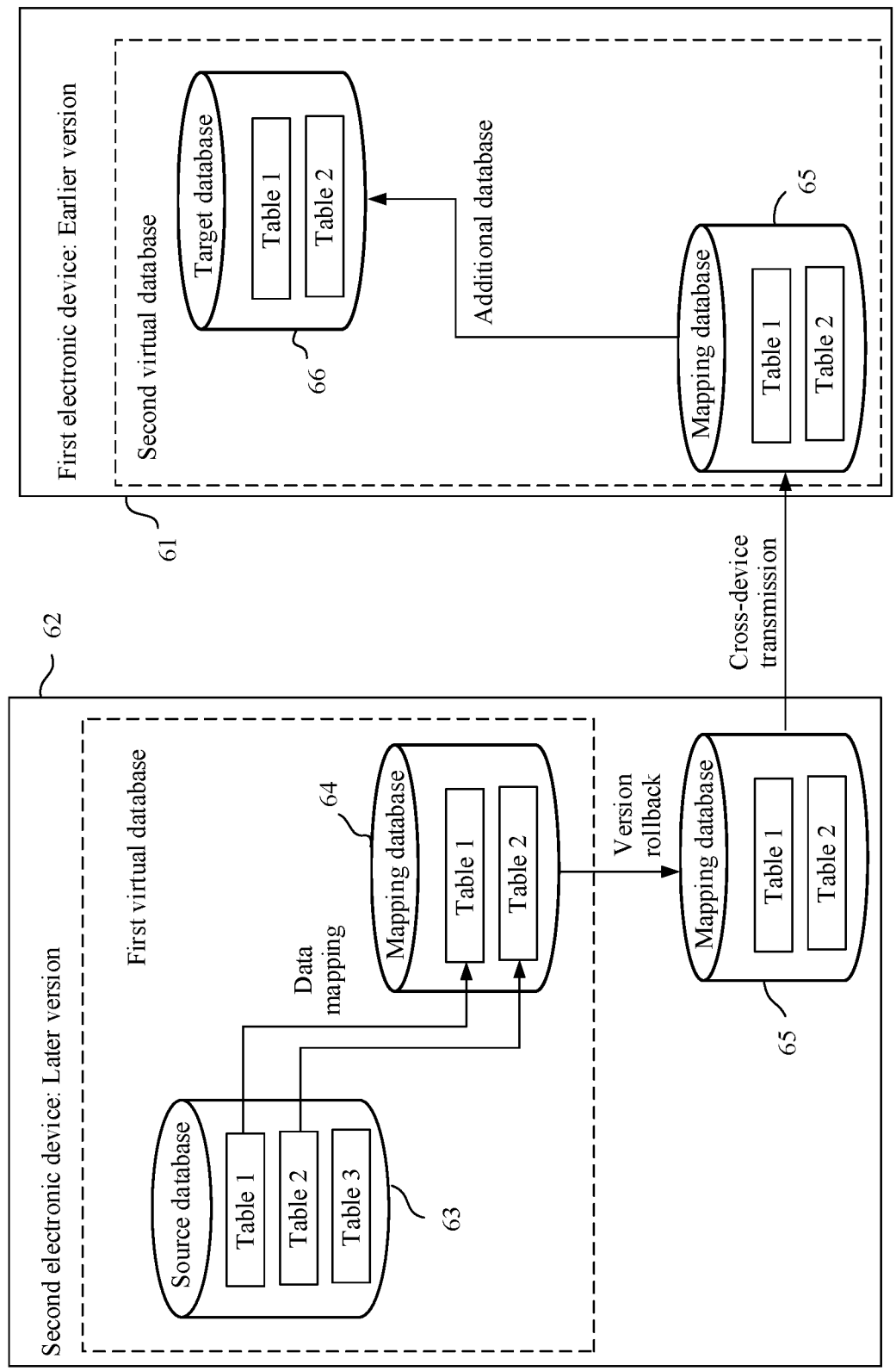
FIG. 6 is a diagram of database mapping from a later version to an earlier version according to an embodiment of this application.
Figure 7:
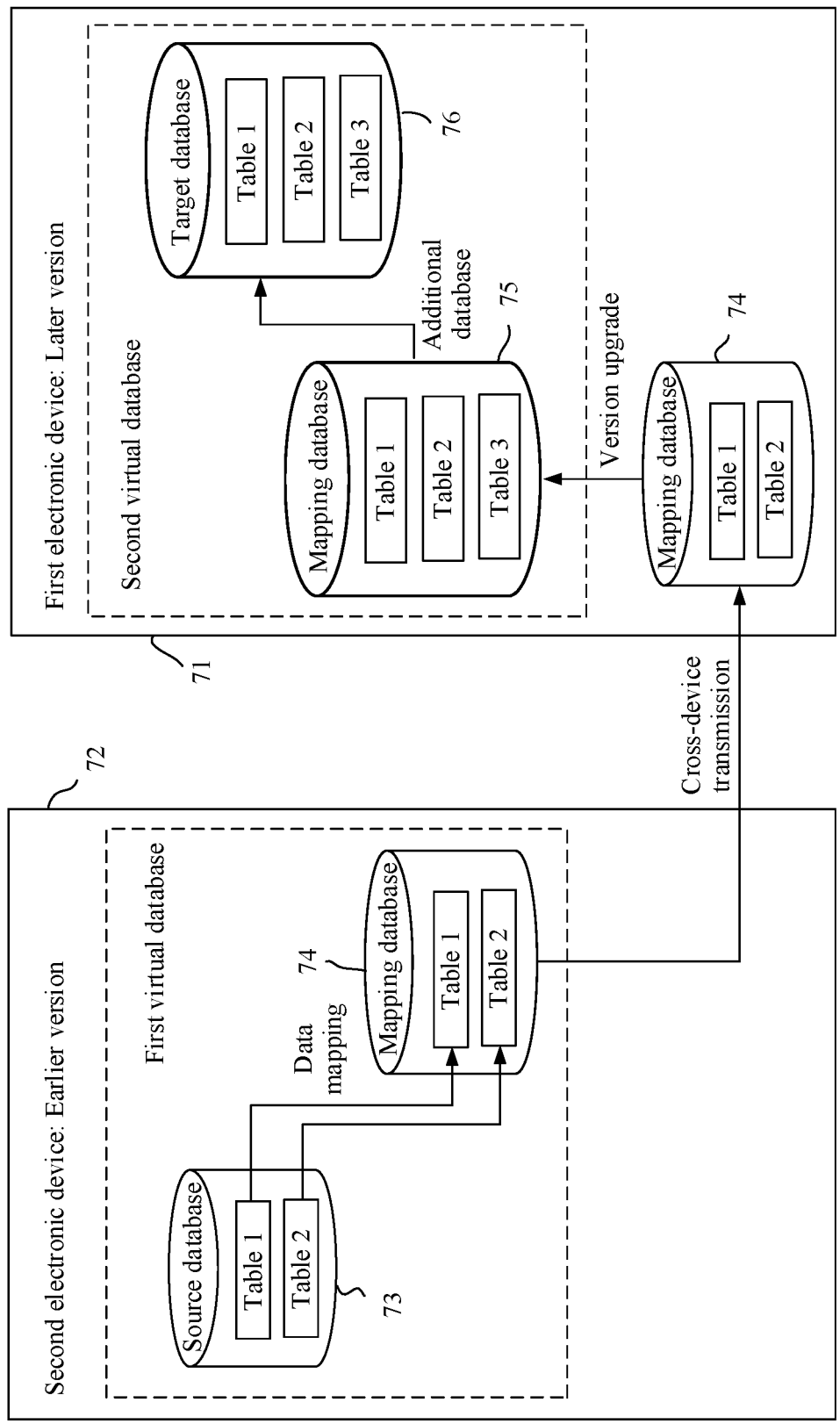
FIG. 7 is a diagram of database mapping from an earlier version to a later version according to an embodiment of this application.

To better describe a database mapping process, the following describes the database mapping process with reference to FIG. 5, FIG. 6, and FIG. 7. FIG. 5 is a diagram of database mapping when database versions are the same according to this embodiment of this application. FIG. 6 is a diagram of database mapping from a later version to an earlier version according to this embodiment of this application. FIG. 7 is a diagram of database mapping from an earlier version to a later version according to this embodiment of this application.

Refer to FIG. 5. A second electronic device 52 includes a source database 53 and a mapping database 54, and a first electronic device 51 includes the mapping database 54 and a target database 55.

In this case, the first electronic device 51 and the second electronic device 52 have same database versions and same table structures. In some embodiments, the source database 53 and the target database 55 have same versions and same table structures. The first source data set is the source database 53, and the first mapping data set is the mapping database 54. The local database of the first electronic device is the target database 55.

After receiving a first event from the first electronic device 51, the second electronic device 52 creates a first empty mapping database of the source database 53. A table structure of the first empty mapping database is consistent with a table structure of the target database 53, and a database version of the first empty mapping database is consistent with the version of the source database 53. Then, the second electronic device 52 virtualizes the first empty mapping database and the source database 53 to obtain a first virtual database, performs fast data mapping in the first virtual database, and maps data of the source database 53 to the first empty mapping database to obtain the mapping database 54. Finally, the second electronic device 52 transmits the mapping database 54 to the first electronic device 51.

After receiving the mapping database 54, the first electronic device 51 virtualizes the mapping database 54 and the target database 55 to obtain a third virtual database.

The second electronic device 52 may transfer a database file of the mapping database 54 to the first electronic device 51, or may transmit data of the mapping database 54 to the first electronic device 51.

In some embodiments, after performing data mapping in the first virtual database to obtain the mapping database 54, the second electronic device 52 may cancel the first virtual database. After sending the mapping database 54 to the first electronic device 51, the second electronic device 52 may clear the mapping database 54 from a local cache.

Refer to FIG. 6. A database version of a second electronic device 62 is later than a database version of a first electronic device 61. In some embodiments, a version of a source database 63 is later than that of a target database 66. The second electronic device 62 includes the source database 63, a mapping database 64, and a mapping database 65, and the first electronic device 61 includes the mapping database 65 and the target database 66.

In this case, the first source data set is the source database 63, the mapping database in which mapping is completed is the mapping database 64, the first mapping data set is the mapping database 65, and the local database of the first electronic device is the target database 66.

After receiving a first event from the first electronic device 61, the second electronic device 62 determines that the version of the source database 63 is later than the version of the target database 66 based on database version information in the first event, learns table structure information of the target database 66 based on database version information of the target database 66, and then creates a first empty mapping database of the source database 63. In this case, a version of the first empty mapping database is consistent with the version of the source database 63, and a table structure of the first empty mapping database is consistent with a table structure of the target database 66. Then, the second electronic device 62 virtualizes the source database 63 and the first empty mapping database to obtain a first virtual database, performs fast data mapping is in the first virtual database, and performs data filtering based on the table structure of the target database 66 to map data of the source database 63 to the first empty mapping database, to obtain the mapping database 64. A version of the mapping database 64 is consistent with the version of the source database 63, and the table structure of the mapping database 64 is consistent with the table structure of the target database 66.

Then, the second electronic device 62 performs a version rollback on the mapping database 64 to obtain the mapping database 65. A version of the mapping database 65 is consistent with the version of the target database 66, and a table structure of the mapping database 65 is consistent with the table structure of the target database 66. Finally, the second electronic device 62 transmits the mapping database 65 to the first electronic device 61.

After receiving the mapping database 65, the first electronic device 61 virtualizes the mapping database 65 and the target database 66 to obtain a third virtual database.

In some embodiments, after performing data mapping to obtain the mapping database 64, the second electronic device 62 may cancel the first virtual database. After performing a version rollback to obtain the mapping database 65, the second electronic device 62 may clear the mapping database 64 from a local cache. After sending the mapping database 65 to the first electronic device 61, the second electronic device 62 may clear the mapping database 65 from the local cache.

Refer to FIG. 7. A database version of a first electronic device 71 is later than a database version of a second electronic device 72. In some embodiments, a version of a target database 76 is later than a version of a source database 73. The first electronic device 71 includes the target database 76, a mapping database 75, and a mapping database 74, and the second electronic device 72 includes the source database 73 and the mapping database 74.

In this case, the first source data set is the source database 73, both the mapping database in which mapping is completed and the first mapping data set are the mapping database 74, and the local database of the first electronic device is the target database 76.

After receiving a first event from the first electronic device 71, the second electronic device 72 determines that the version of the target database 76 is later than the version of the source database 73 based on database version information in the first event. Then, the second electronic device 72 creates a first empty mapping database of the source database 73, where a version of the first empty mapping database is consistent with the version of the source database 73, and a table structure of the first empty mapping database is consistent with a table structure of the source database 73. Next, the second electronic device 72 virtualizes the first empty mapping database and the source database 73 to obtain a first virtual database, and performs fast data mapping in the first virtual database to obtain the mapping database 74. A version of the mapping database 74 is consistent with the version of the source database 73, and a table structure of the mapping database 74 is consistent with the table structure of the source database 73. Finally, the second electronic device 72 transmits the mapping database 74 to the first electronic device 71.

After receiving the mapping database 74, the first electronic device 71 performs database version upgrade on the mapping database 74 to obtain the mapping database 75. A version of the mapping database 75 is consistent with the version of the target database 76, and a table structure the mapping database 75 is consistent with a table structure of the target database 76. Then, the first electronic device 71 virtualizes the mapping database 75 and the target database 76 to obtain a third virtual database.

In some embodiments, after performing data mapping to obtain the mapping database 74, the second electronic device 72 may cancel the first virtual database. After sending the mapping database 74 to the first electronic device 71, the second electronic device 72 may clear the mapping database 74 in a local cache. In addition, after performing version upgrade to obtain the mapping database 75, the first electronic device 71 may clear the mapping database 74 in the local cache.

This embodiment of this application provides a database mapping procedure when table structures between devices are the same (that is, database versions are the same), and a database mapping procedure when table structures between devices are different (that is, database versions are different). In this way, database mapping may still be implemented even if the table structures between the devices are different, and an application range is wider.

The foregoing shows an example process in which the second electronic device creates the first mapping data set of the first source data set based on the first event of the first electronic device. The following describes a process in which the first electronic device creates the second mapping data set of the second source data set based on the second event of the second electronic device.

Figure 8:
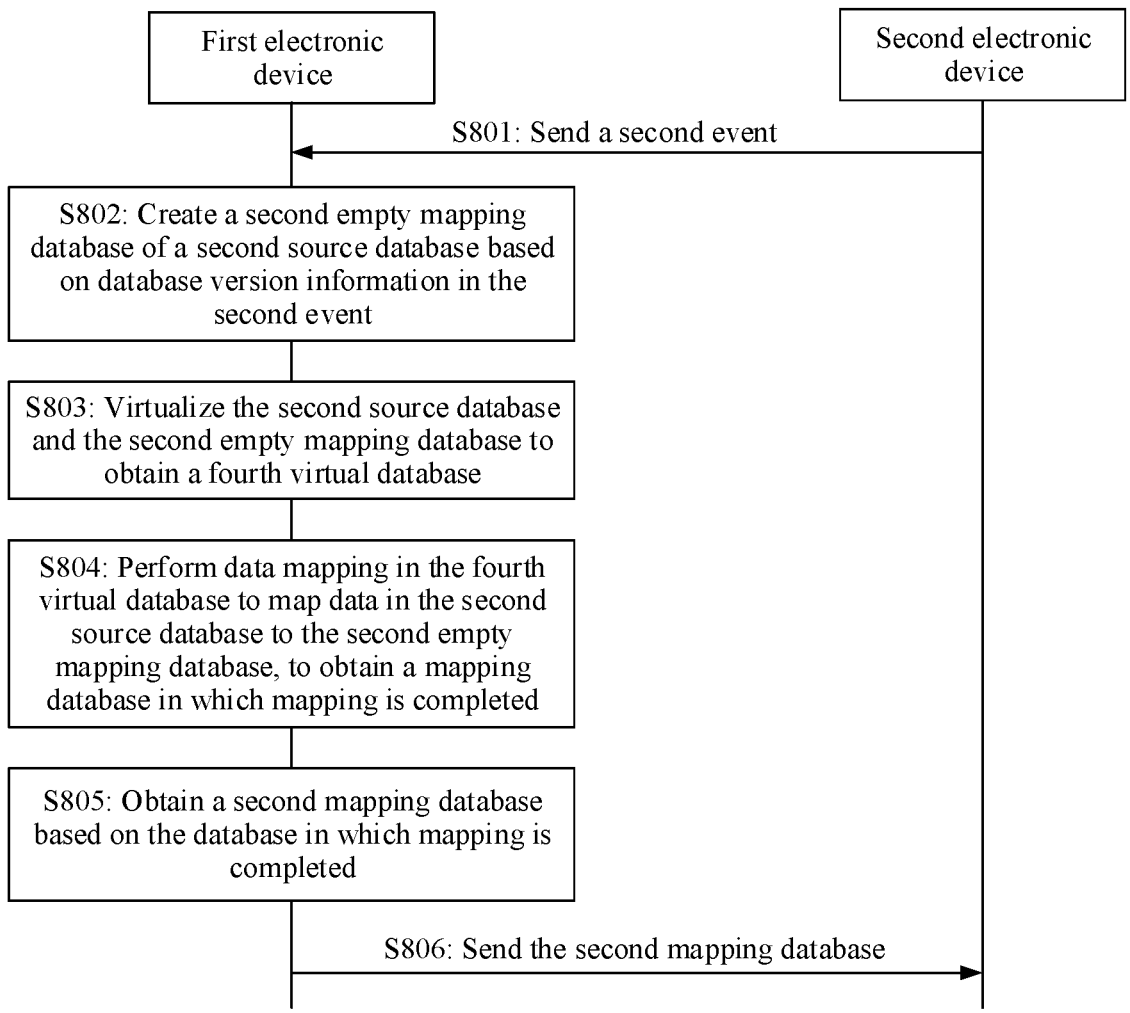
FIG. 8 is a diagram of a procedure of a database mapping mode according to an embodiment of this application.

FIG. 8 is a diagram of a procedure of the database mapping mode according to this embodiment of this application. The procedure may include the following operations.

Operation S801: The second electronic device sends the second event to the first electronic device.

Operation S802: The first electronic device creates a second empty mapping database of a second source database based on database version information in the second event.

The second source database means the local database of the first electronic device. The database version information included in the second event describes a version of the local database of the second electronic device. The second empty mapping database means an empty database in which no data is loaded.

Operation S803: The first electronic device virtualizes the second source database and the second empty mapping database to obtain a fourth virtual database.

Operation S804: The first electronic device performs data mapping in the fourth virtual database to map data in the second source database to the second empty mapping database, to obtain a mapping database in which mapping is completed.

Operation S805: The first electronic device obtains a second mapping database based on the mapping database in which mapping is completed.

Operation S806: The first electronic device sends the second mapping database to the second electronic device.

After receiving the second mapping database, the second electronic device may virtualize the second mapping database and the second source database to obtain a third virtual database. Based on the third virtual database, the second electronic device may access the data of the first electronic device in a cross-device and converged manner.

It should be noted that a process in which the second electronic device creates the second mapping database is similar to a process in which the first electronic device creates the first mapping database. For same or similar parts, refer to related content in FIG. 4, FIG. 5, FIG. 6, and FIG. 7. Details are not described herein.

Figure 9:
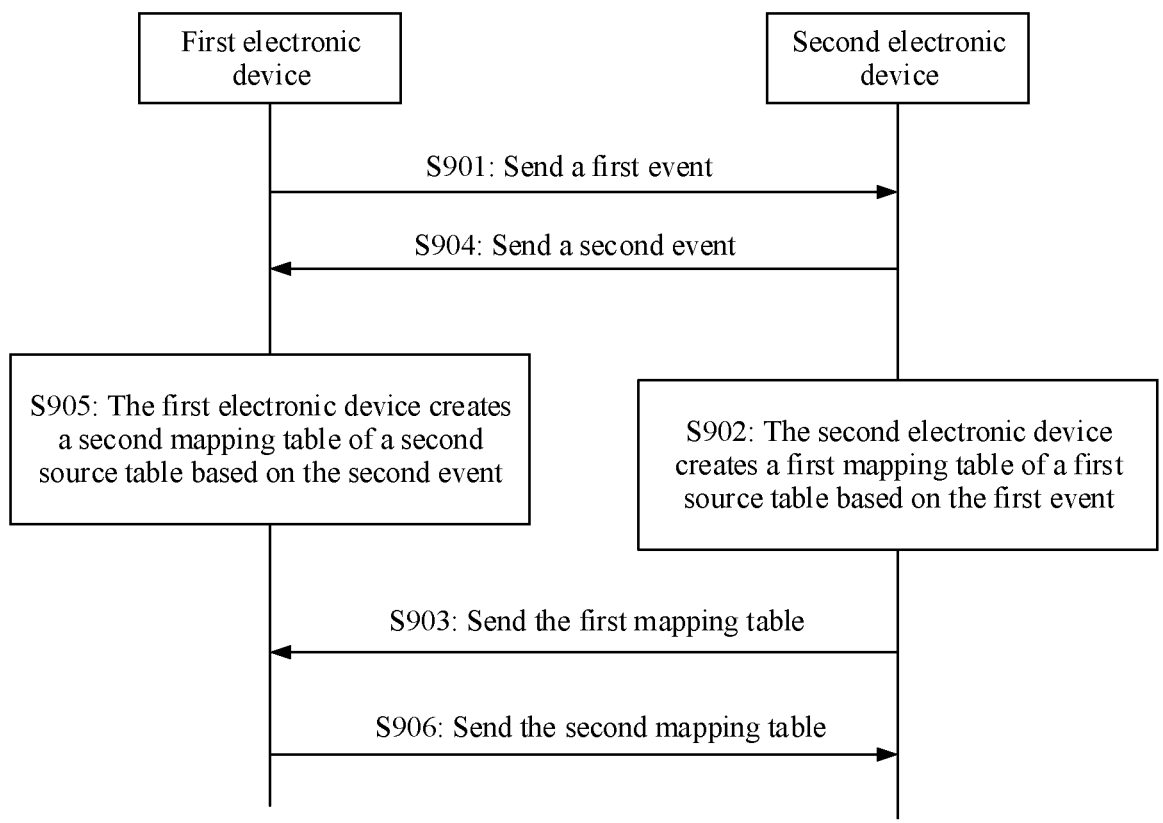
FIG. 9 is a diagram of a table mapping procedure according to an embodiment of this application.

After the database mapping procedure is described, the following describes the table mapping procedure with reference to FIG. 9.

Table Mapping Procedure:

FIG. 9 is a diagram of the table mapping procedure according to an embodiment of this application. The table mapping procedure may include the following operations.

Operation S901: The first electronic device sends the first event to the second electronic device.

In this case, because the second electronic device may not consider a database version when creating the first mapping table, the first event may not include the database version information.

Operation S902: The second electronic device creates a first mapping table of a first source table based on the first event.

In this case, the first source data set is the first source table, and the first mapping data set is the first mapping table. The first source table means a database table in the local database of the second electronic device.

In some embodiments, the second electronic device may not consider whether structures of the first mapping table and the first source table are the same when mapping data content of the first source table to the first mapping table.

Operation S903: The second electronic device sends the first mapping table to the first electronic device.

Operation S904: The second electronic device sends the second event to the first electronic device.

Similarly, because the first electronic device may not need to consider the database version when creating the second mapping table, the second event may not include the database version information.

Operation S905: The first electronic device creates a second mapping table of a second source table based on the second event.

In this case, the second source data set is the second source table, and the second mapping data set is the second mapping table. The second source table means a database table in the local database of the first electronic device. A structure of the second mapping table is consistent with a structure of the second source table.

Similarly, the first electronic device may not consider whether structures of the second mapping table and the second source table are the same when mapping data content of the second source table to the second mapping table.

Operation S906: The first electronic device sends the second mapping table to the second electronic device.

After receiving the first mapping table of the second electronic device, the first electronic device may associate the device information of the second electronic device with the first mapping table. Similarly, the second electronic device may associate the device information of the first electronic device with the second mapping table.

It can be seen that, a database table is mapped to a peer device as a whole, so that database-table-level data synchronization is implemented. This reduces time consumed for data synchronization, and improves a data availability speed.

In some embodiments, to implement cross-device data convergence access, the first electronic device or the second electronic device may create an intermediate result database, load a mapping table of a peer device into the intermediate result database, and load a local mapping table into the intermediate result database. In this way, data of a plurality of devices may be accessed from the intermediate result database based on one query.

In some embodiments, after the local database is initialized, the first electronic device may create a mapping table of the local database table. The first electronic device sends the first event to the second electronic device, and creates the intermediate result database. After receiving the first mapping table from the second electronic device, the first electronic device loads the first mapping table and the mapping table of the local database table into the created intermediate result database. In this way, an application on the first electronic device may access the data of the first electronic device and the data of the second electronic device from the intermediate result database based on one query request.

Similarly, after the local database is initialized, the second electronic device may create a mapping table of the local database table, send the second event to the first electronic device, and create the intermediate result database. After receiving the second mapping table from the first electronic device, the second electronic device loads the second mapping table and the mapping table of the local database table into the created intermediate result database. An application on the second electronic device may access the data of the first electronic device and the data of the second electronic device from the intermediate result database based on one query request.

It should be noted that database-level and database-table-level data mapping and synchronization solutions provided in this embodiment of this application may be applied to a data convergence access scenario, or may be applied to another scenario.

Data Change Monitoring Process:

After receiving a mapping data set of the peer device, the first electronic device or the second electronic device may monitor data change information of the peer device in real time. After receiving the data change information of the peer device, the first electronic device or the second electronic device loads change data into a mapping data set of a peer device in local storage space based on the data change information.

Figure 10:
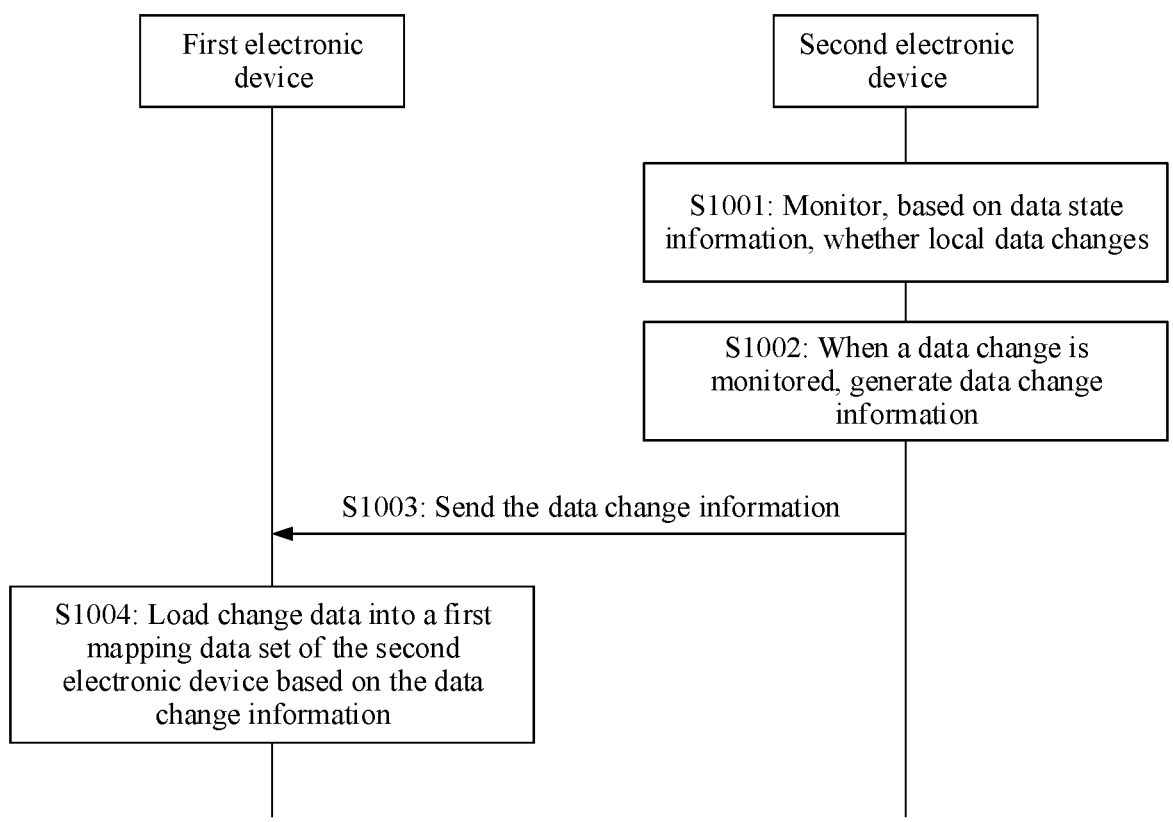
FIG. 10 is a diagram of a data change monitoring process according to an embodiment of this application.

FIG. 10 is a diagram of the data change monitoring process according to this embodiment of this application. The process may include the following operations.

Operation S1001: The second electronic device monitors, based on data state information, whether local data changes.

The data state information is created when the second electronic device performs data mapping. For example, as shown in FIG. 5. FIG. 6, and FIG. 7, when performing data mapping in the first virtual database, the second electronic device records the data state information. The data state information describes a state of data mapped to a peer device, and may be a data state tree.

The second electronic device compares, based on the data state information, data at a current moment with data recorded in the data state information, and determines whether the data at the current moment changes compared with data previously mapped to the first electronic device.

Operation S1002: When a data change is monitored, the second electronic device generates data change information.

If it is determined that the data changes, the second electronic device generates the data change information based on change data. The data change information describes the change data.

In some embodiments, after generating the data change information, the second electronic device may further modify the data state information. In some embodiments, the second electronic device updates a state record of the change data in the data state information based on the change data. Modified data state information may be used as a basis for determining whether the data changes next time.

Operation S1003: The second electronic device sends the data change information to the first electronic device.

In some embodiments, the second electronic device may monitor and record a data change by using a change script, record the data change information in a table in the change script, and then transmit the change script to the first electronic device. In this way, file-level synchronization is implemented, and a data change synchronization speed is improved.

Certainly, in some other embodiments, the second electronic device may also synchronize change data to the first electronic device piece by piece.

Operation S1004: The first electronic device loads change data into the first mapping data set of the second electronic device based on the data change information.

In the database mapping mode, database versions of the first electronic device and the second electronic device may be different. In this case, the first electronic device may converge the change data and the data in the first mapping data set based on a database version. The following describes a data change monitoring process with reference to FIG. 11 and FIG. 12.

Figure 11:
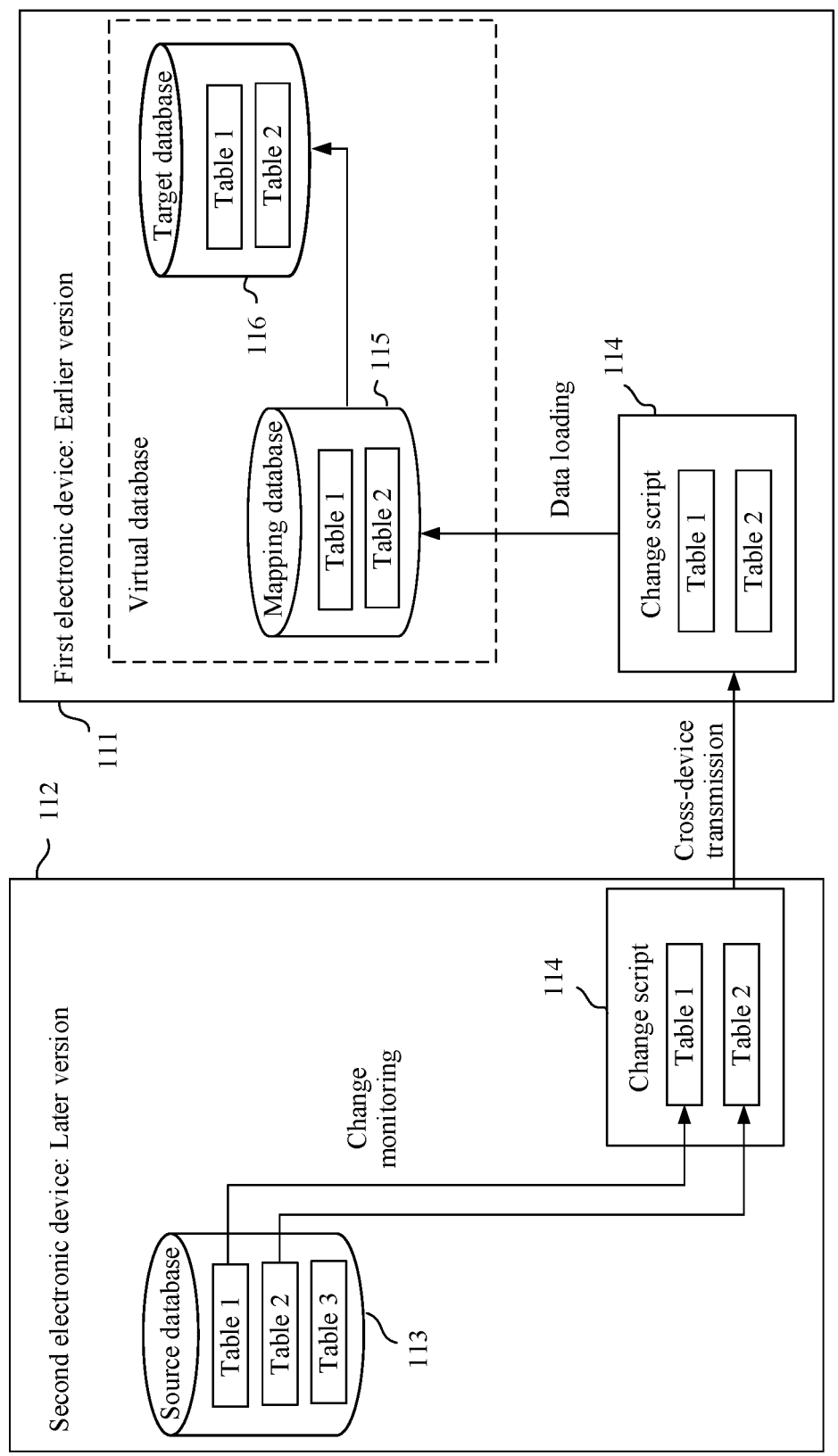
FIG. 11 is a diagram of a data change monitoring process in which a later version is synchronized to an earlier version according to an embodiment of this application.

FIG. 11 is a diagram of the data change monitoring process in which a later version is synchronized to an earlier version according to this embodiment of this application. A database version of a first electronic device 111 is earlier than a database version of a second electronic device 112, the second electronic device 112 includes a source database 113 and a change script 114, and the first electronic device 111 includes the change script 114, a mapping database 115, and a target database 116.

The source database 113 is a local database of the second electronic device 112, the mapping database 115 is a mapping database of the source database 113, and the target database 116 is a local database of the first electronic device.

After a data mapping process, the second electronic device 112 transmits the mapping database of the source database 113 to the first electronic device 111, and the first electronic device 111 virtualizes the mapping database 115 and the target database 116 into one virtual database.

After data mapping, the second electronic device 112 monitors a data change of the source database 113 in real time by using the change script 114 based on a data state tree created in the data mapping process, and records change data of the source database 113 in a table in the change script 114. A table structure of the change script 114 is consistent with a database of the target database 116. In this case, the data change information is represented as the change script 114.

After determining that the data changes, the second electronic device 112 records the change data in a database table in the change script 114, updates the data state tree, and then transmits the change script 114 to the first electronic device 111.

After receiving the change script 114, the first electronic device 111 loads the change data into the mapping database 115 in batches by using the change script 114. In this way, after data mapping, when the data of the second electronic device changes, the change data may be synchronized to the first electronic device in real time.

Figure 12:
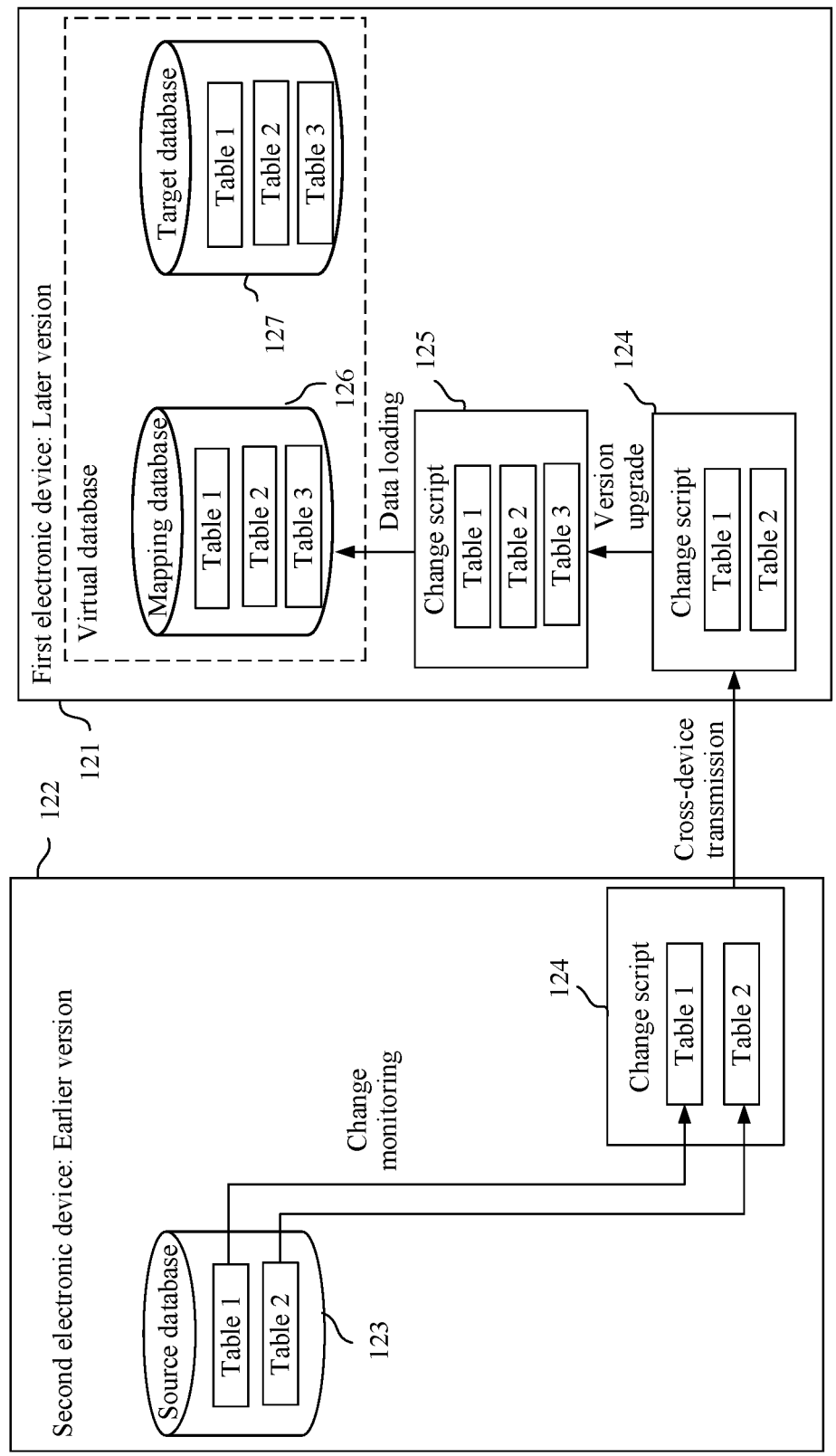
FIG. 12 is a diagram of a data change monitoring process in which an earlier version is synchronized to a later version according to an embodiment of this application.

FIG. 12 is a diagram of the data change monitoring process in which an earlier version is synchronized to a later version according to this embodiment of this application. A database version of a first electronic device 121 is later than a database version of a second electronic device 122. The second electronic device 122 includes a source database 123 and a change script 124, and the first electronic device 121 includes the change script 124, a change script 125, a mapping database 126, and a target database 127.

The source database 123 is a local database of the second electronic device 122, the mapping database 126 is a mapping database of the source database 123, and the target database 127 is a local database of the first electronic device 121.

After a data mapping process, the second electronic device 122 transmits the mapping database of the source database 123 to the first electronic device 121, and the first electronic device 121 virtualizes the mapping database 126 and the target database 127 into one virtual database.

After data mapping, the second electronic device 122 monitors a data change of the source database 113 in real time by using the change script 124 based on a data state tree created in the data mapping process, and records change data of the source database 123 in a table in the change script 124. A table structure of the change script 124 is consistent with a table structure of a database of the source database 123. In this case, the data change information is represented as the change script 124.

After determining that the data changes, the second electronic device 122 records the change data in the database table in the change script 124, updates the data state tree, and transmits the change script 124 to the first electronic device 121.

After receiving the change script 124, the first electronic device 121 first performs version upgrade on the change script 124 to obtain the change script 125. A table structure of the change script 125 is consistent with a table structure of the target database 127. Then, the first electronic device 121 loads the change data into the mapping database 126 in batches by using the change script 125. In this way, after data mapping, when the data of the second electronic device changes, the change data may be synchronized to the first electronic device in real time.

When the database version of the first electronic device is equal to the database version of the second electronic device, the data change monitoring process may be shown in FIG. 11. In some embodiments, a data change monitoring process when database versions of two devices are the same may be the same as a data change monitoring process when a later version is synchronized to an earlier version.

When a data mapping procedure is the table mapping procedure, the second electronic device may monitor and record a data change by using the change script, and record change data in the table in the change script. When receiving a change script from the first electronic device, the first electronic device may load the change data into a corresponding mapping table of the intermediate result database in batches by using the change script. The corresponding mapping table means a mapping table of a local database table of the second electronic device.

The foregoing shows a procedure on a side of the first electronic device and a side of the second electronic device when data on the side of the second electronic device changes. When data on the side of the first electronic device changes, a procedure on the side of the first electronic device is similar to the foregoing procedure on the side of the second electronic device, and the procedure on the side of the second electronic device is similar to the foregoing procedure on the side of the first electronic device. Details are not described herein.

In this embodiment of this application, the data state information is recorded during data mapping, and whether the data changes is monitored in real time based on the data state information. When the data changes, the change data is synchronized to a peer device based on the data state information, so that cross-device data state management may be implemented, and cross-device real-time data query is implemented.

Data Convergence Access Process:

An electronic device may implement cross-device data convergence access by using a database link (DBlink).

In some embodiments, the electronic device presets a DBlink of a peer device in a local database. After obtaining an access request, the electronic device first links to a database of the peer device based on the DBlink of the peer device, then scans the database of the peer device, and backhauls all data in the database of the peer device to the local database. Finally, the electronic device disconnects the database link to the peer device, and returns an access result corresponding to the access request. In this way: the electronic device may query the data of the peer device in the local database through one query, to implement cross-device data access.

It can be learned from the foregoing that, from initiating the access to obtaining the access result, processes of database link to the peer device, database scan and data backhaul of the peer device, and the like are performed. This is time-consuming, thereby causing low performance of cross-device data access. In addition, when the data of the peer device is backhauled locally, a large amount of data is transmitted, and a large amount of bandwidth is occupied. A transmission time depends on network quality. In some embodiments, network transmission quality affects performance of cross-device data access.

The following describes the data convergence access process with the side of the first electronic device as an example. For a data convergence access process on the side of the second electronic device, reference may be made to the process on the side of the first electronic device. Details are not described herein.

Figure 13:
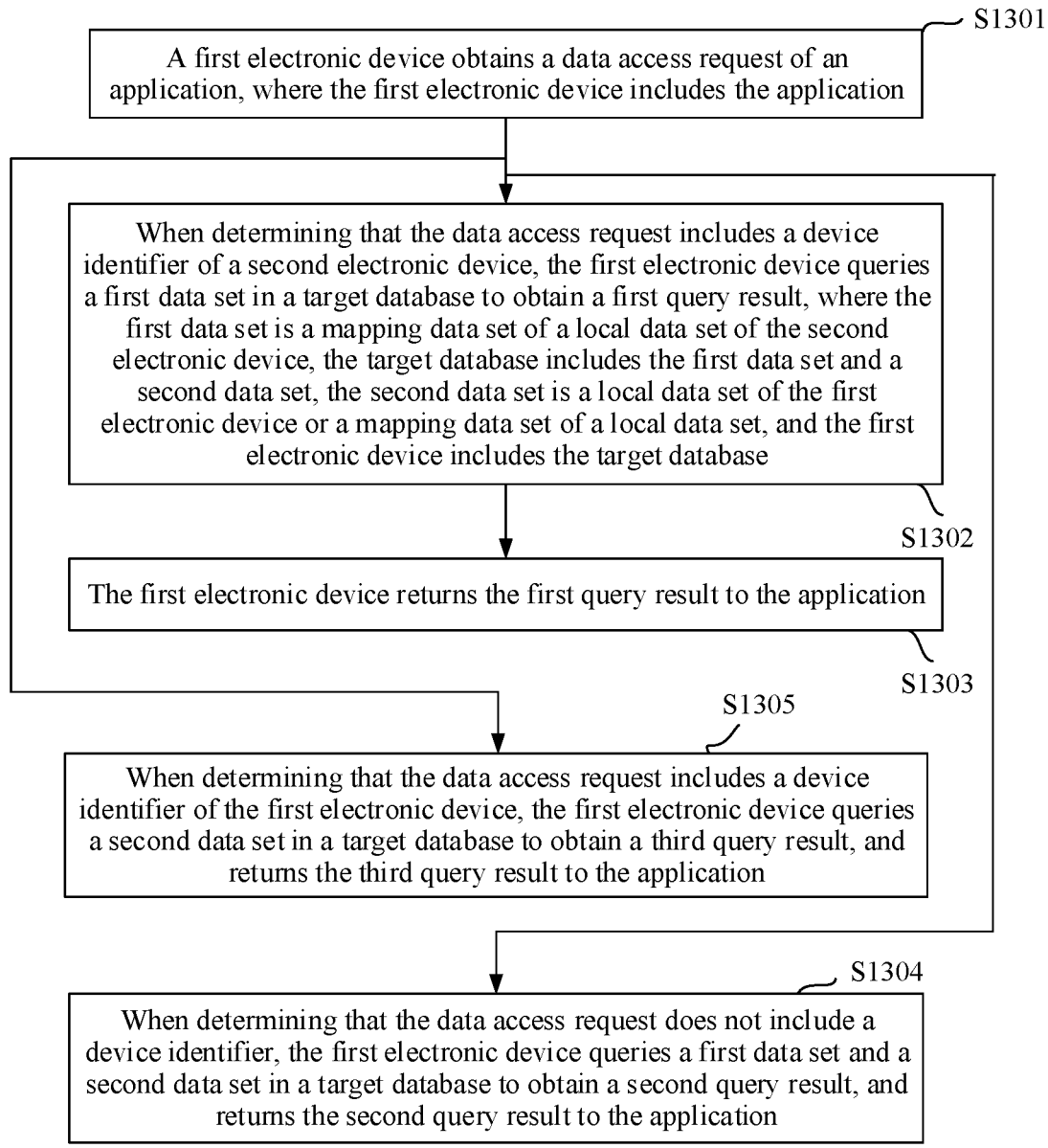
FIG. 13 is a block diagram of a procedure of a data convergence access process according to an embodiment of this application.

FIG. 13 is a block diagram of a procedure of the data convergence access process according to this embodiment of this application. The process may include the following operations.

Operation S1301: The first electronic device obtains a data access request of an application, where the first electronic device includes the application.

The application on the first electronic device may be, for example, a gallery or a third-party application. The application is not limited herein.

Operation S1302: When determining that the data access request includes a device identifier of the second electronic device, the first electronic device queries a first data set in a target database to obtain a first query result, where the first data set is a mapping data set of a local data set of the second electronic device, the target database includes the first data set and a second data set, the second data set is a local data set of the first electronic device or a mapping data set of a local data set, and the first electronic device includes the target database.

The data access request initiated by the application carries a device identifier, and the device identifier is for uniquely identifying a device. For example, the device identifier may be a device ID. When the data access request carries the device identifier, data of a corresponding device is accessed based on a pre-established association relationship between the device identifier and a data set. Alternatively, when the data access request does not carry the device identifier, data of all devices is accessed.

The device identifier of the second electronic device may be pre-stored locally in the first electronic device. For example, in the data mapping process, the first electronic device receives the second event from the second electronic device, and locally stores the device identifier of the second electronic device carried in the second event.

The target database may be a virtual database or an intermediate result database. When the target database is the virtual database, the first data set is the mapping database of the local database of the second electronic device, and the first data set is the local database of the first electronic device. When the target database is the intermediate result database, the first data set is a mapping table of a local database table of the second electronic device, and the first data set is a mapping table of a local database table of the first electronic device.

When the data access request includes the device identifier of the second electronic device, the first electronic device queries the mapping database of the second electronic device in the target database to obtain the first query result.

Operation S1303: The first electronic device returns the first query result to the application.

In some embodiments, operation S1304: When determining that the data access request does not include a device identifier, the first electronic device queries a first data set and a second data set in a target database to obtain a second query result, and returns the second query result to the application.

Operation S1305: When determining that the data access request includes a device identifier of the first electronic device, the first electronic device queries a second data set in a target database to obtain a third query result, and returns the third query result to the application.

Figure 14:
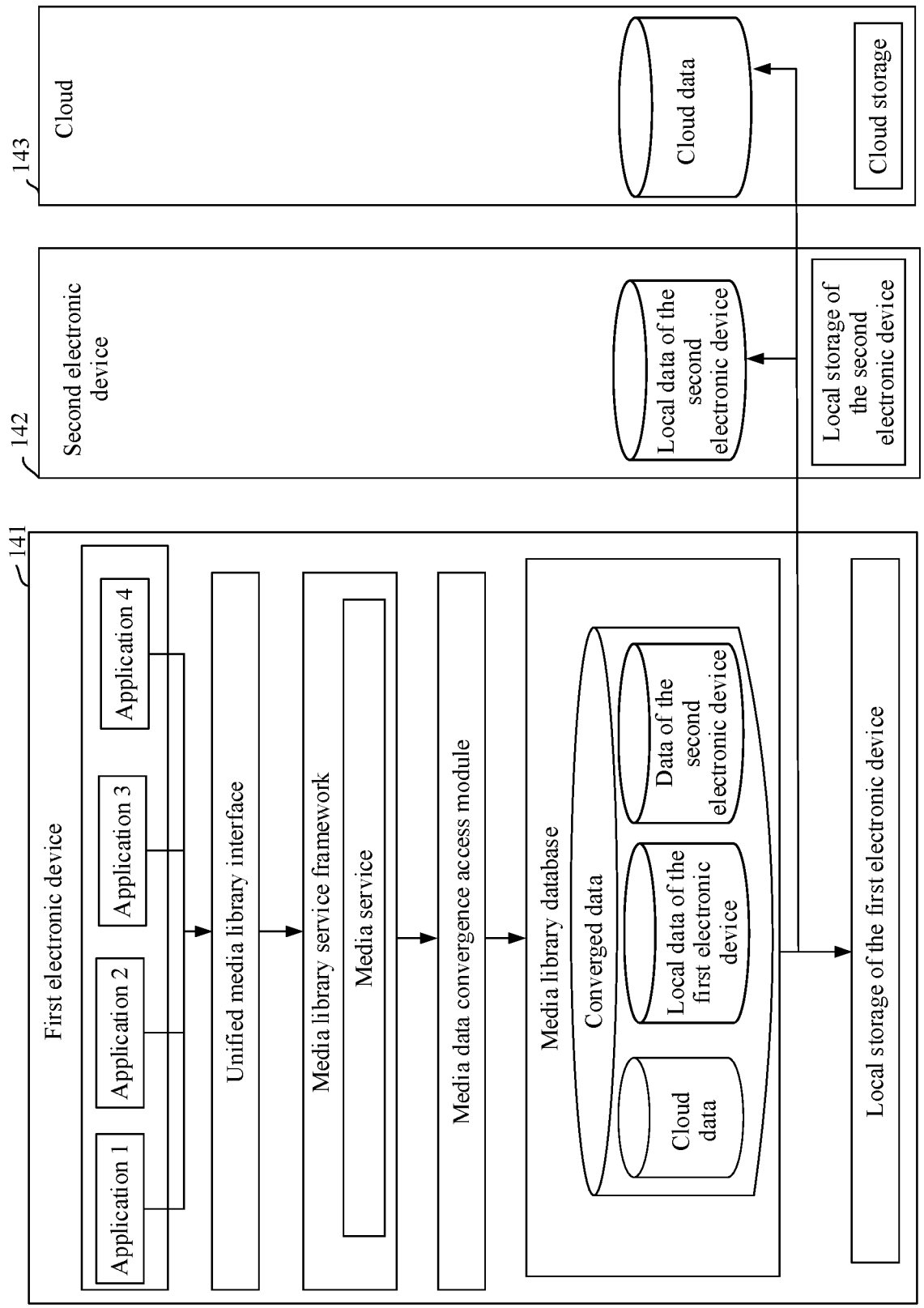
FIG. 14 is a diagram of cross-device media data convergence access according to an embodiment of this application.
Figure 15A:
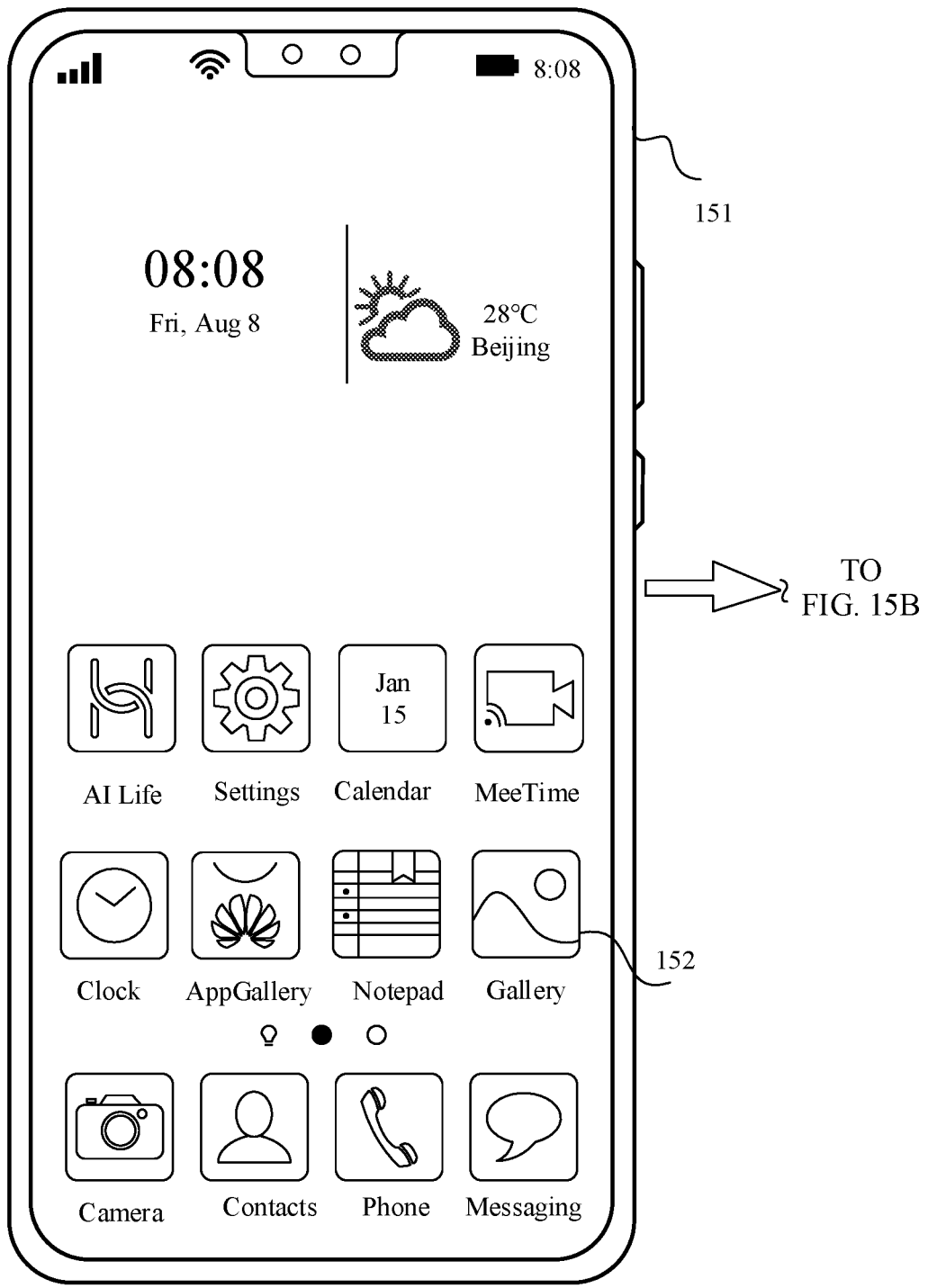
FIG. 15A to FIG. 15E are diagrams of cross-device image data access according to an embodiment of this application.
Figure 15B:
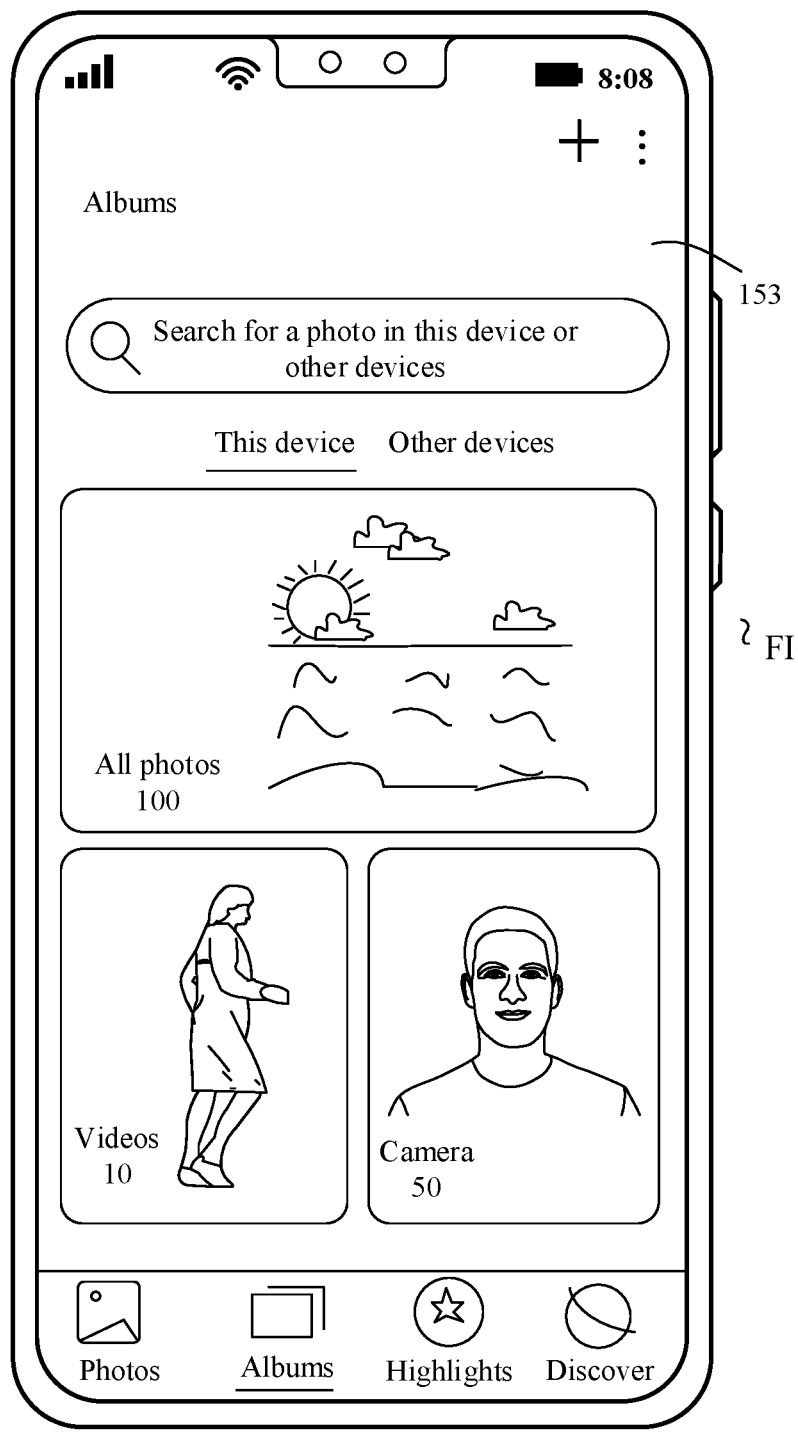
Figure 15C:
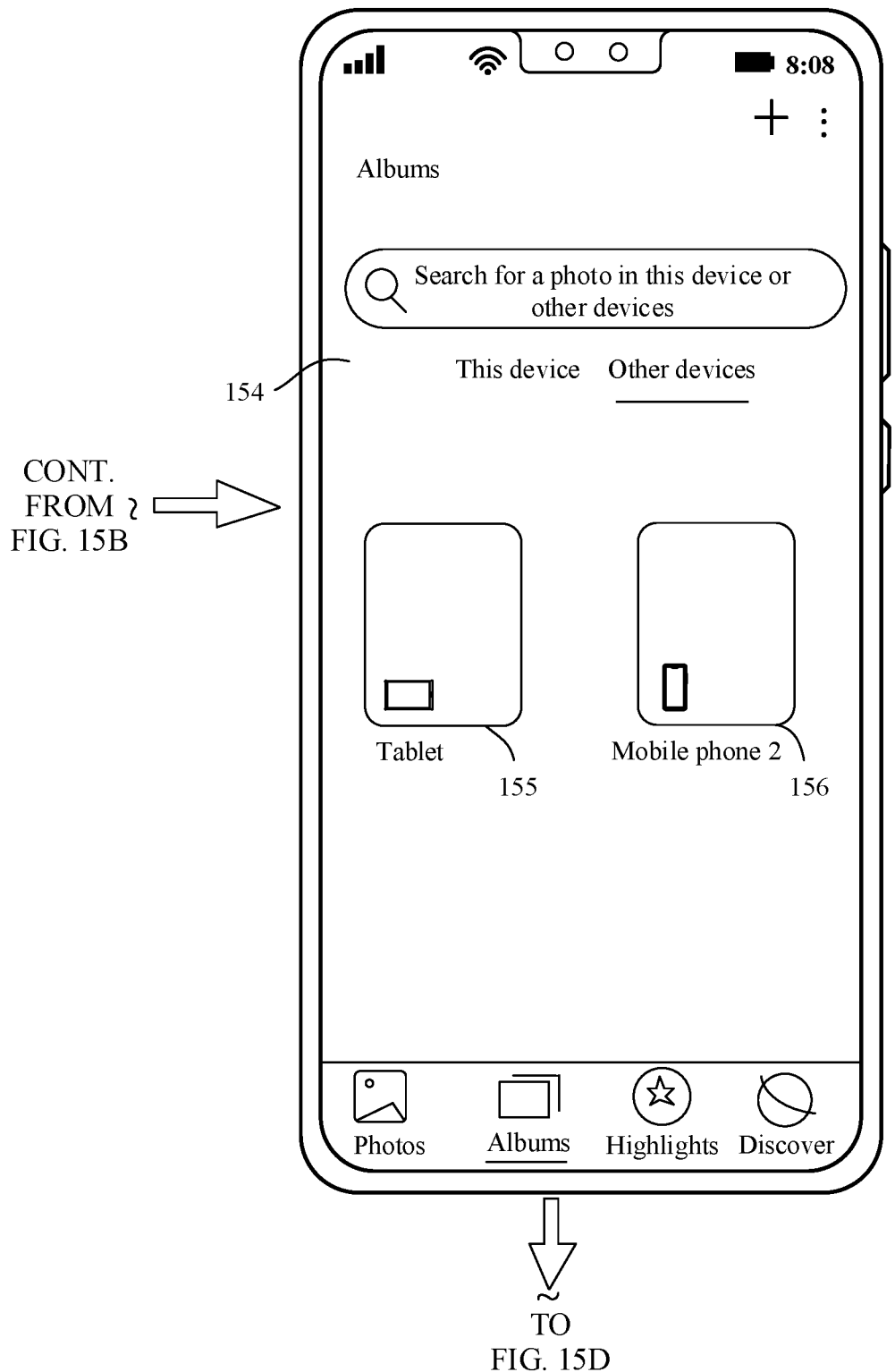
Figure 15D:
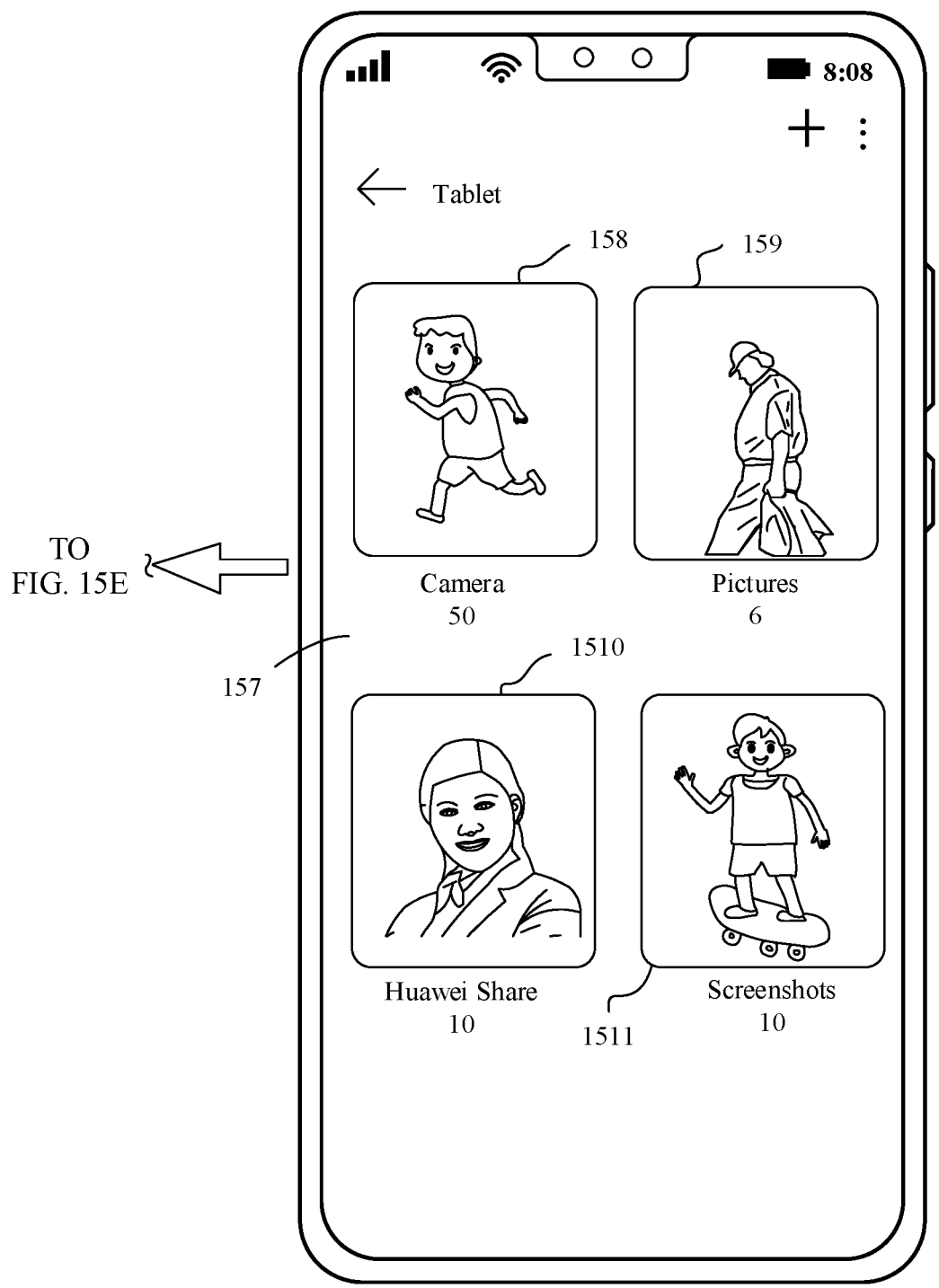
Figure 15E:
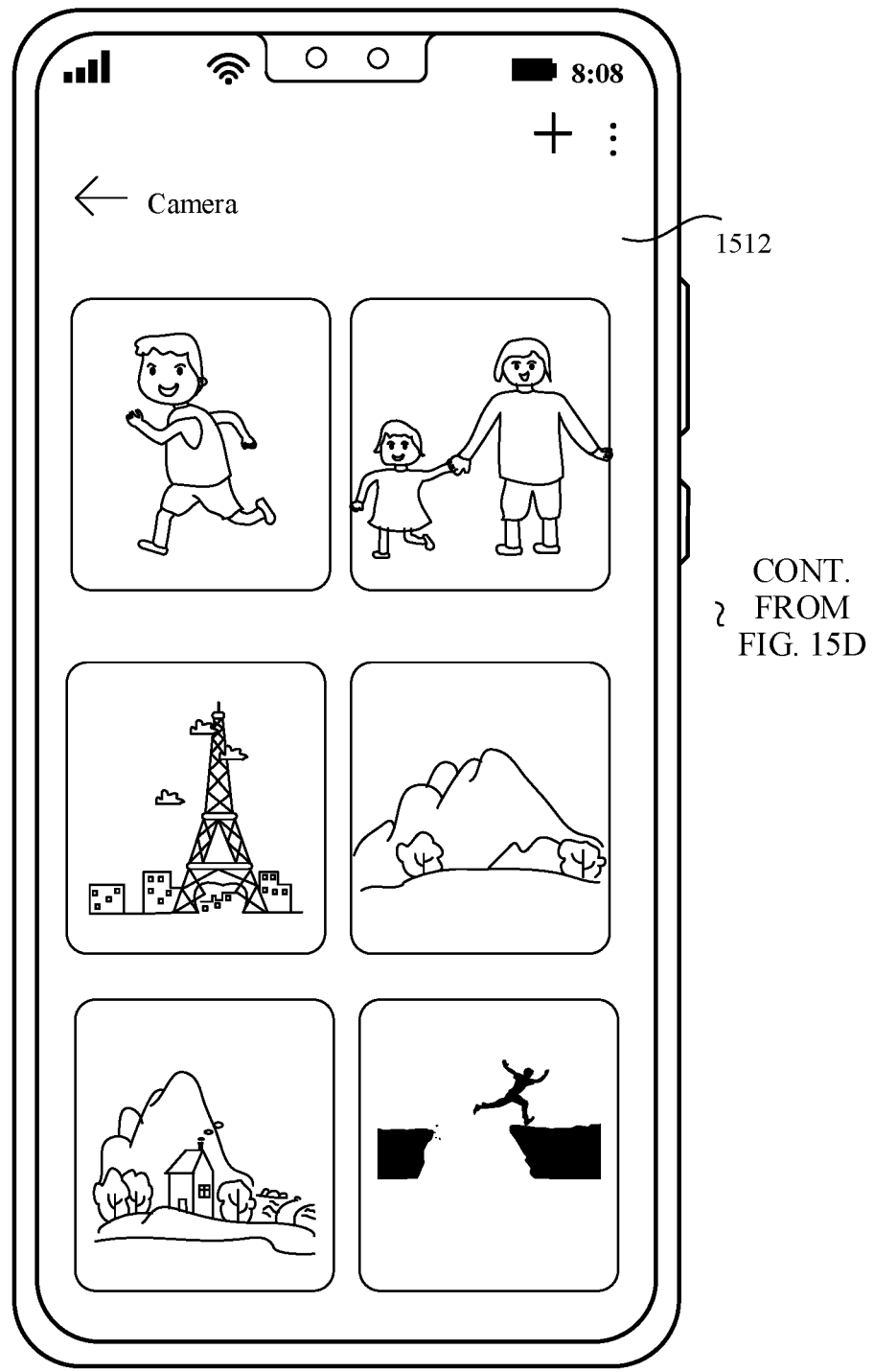

Cross-device media data convergence access is used as an example. FIG. 14 is a diagram of the cross-device media data convergence access according to this embodiment of this application. A first electronic device 141 maps data of a second electronic device 142 and data of a cloud 143 to a local media library database. In this way, when an application of the first electronic device 141 needs to access the data of the second electronic device 142 or the data of the cloud 143, cross-device data convergence access may be implemented by accessing corresponding data in the local media library database. In this case, the cloud 143 may be considered as a device.

The first electronic device 141 includes a media library. The media library is an in-house media data management framework developed by Huawei, and supports an application in accessing distributed media data.

For example, the first electronic device 141 includes an application 1, an application 2, an application 3, and an application 4. Each application may perform cross-device media data convergence access by invoking a unified media library interface.

For example, the application 1 may initiate a data access request by invoking the unified media library interface, and specify a device identifier of the second electronic device 142 in the data access request. In some embodiments, the application 1 needs to access media data of the second electronic device 142. A media library service framework transfers the data access request to a media data convergence access module, and the media data convergence access module queries data of the second electronic device in converged data based on the device identifier carried in the data access request, to obtain a query result. Finally, the media library database returns the query result to the application 1.

For example, FIG. 15A to FIG. 15E are diagrams of cross-device image data access according to this embodiment of this application. In this case, the first electronic device is a mobile phone 151, and the second electronic device includes a tablet and a mobile phone 2.

As shown in FIG. 15A to FIG. 15E, a home screen of the mobile phone 151 includes a plurality of applications, for example, Settings, Calendar, Clock, AppGallery, Gallery 152, and the like. When the mobile phone 151 receives a click operation on the Gallery 152, the mobile phone 151 displays an album interface 153 in response to the click operation. The album interface 153 displays a photo, a video, a camera picture, and the like on this device. If a user needs to access image data of another device, the user may click "other devices" on the album interface 153. When receiving a click operation on "other devices", the mobile phone 151 displays an interface 154 in response to the click operation. The interface 154 includes a folder 155 of the tablet and a folder 156 of the mobile phone 2.

If a user wants to access data on the tablet across devices, the user may click the folder 155. If the user wants to access data on the mobile phone 2 across devices, the user may click the folder 156.

When receiving a click operation on the folder 155, the mobile phone 151 displays an interface 157 in response to the click operation. The interface 157 includes a camera folder 158, a pictures folder 159, a Huawei Share folder 1510, and a screenshots folder 1511.

The mobile phone 151 invokes the unified media library interface in response to the click operation on the folder 155 to initiate a data access request, and specifies a device identifier of the tablet in the data access request. The media data convergence access module in the mobile phone 151 queries the data of the tablet in the media library database based on the data access request, and returns a query result to the Gallery. After receiving the query result, the Gallery displays an interface 157 based on the query result.

When receiving a click operation on the camera folder 158, the mobile phone 151 displays an interface 1512 in response to the click operation. The interface 1512 includes photos taken by a camera of the tablet. In this way, the user may access image data of the tablet on the mobile phone 151.

Figure 16A:
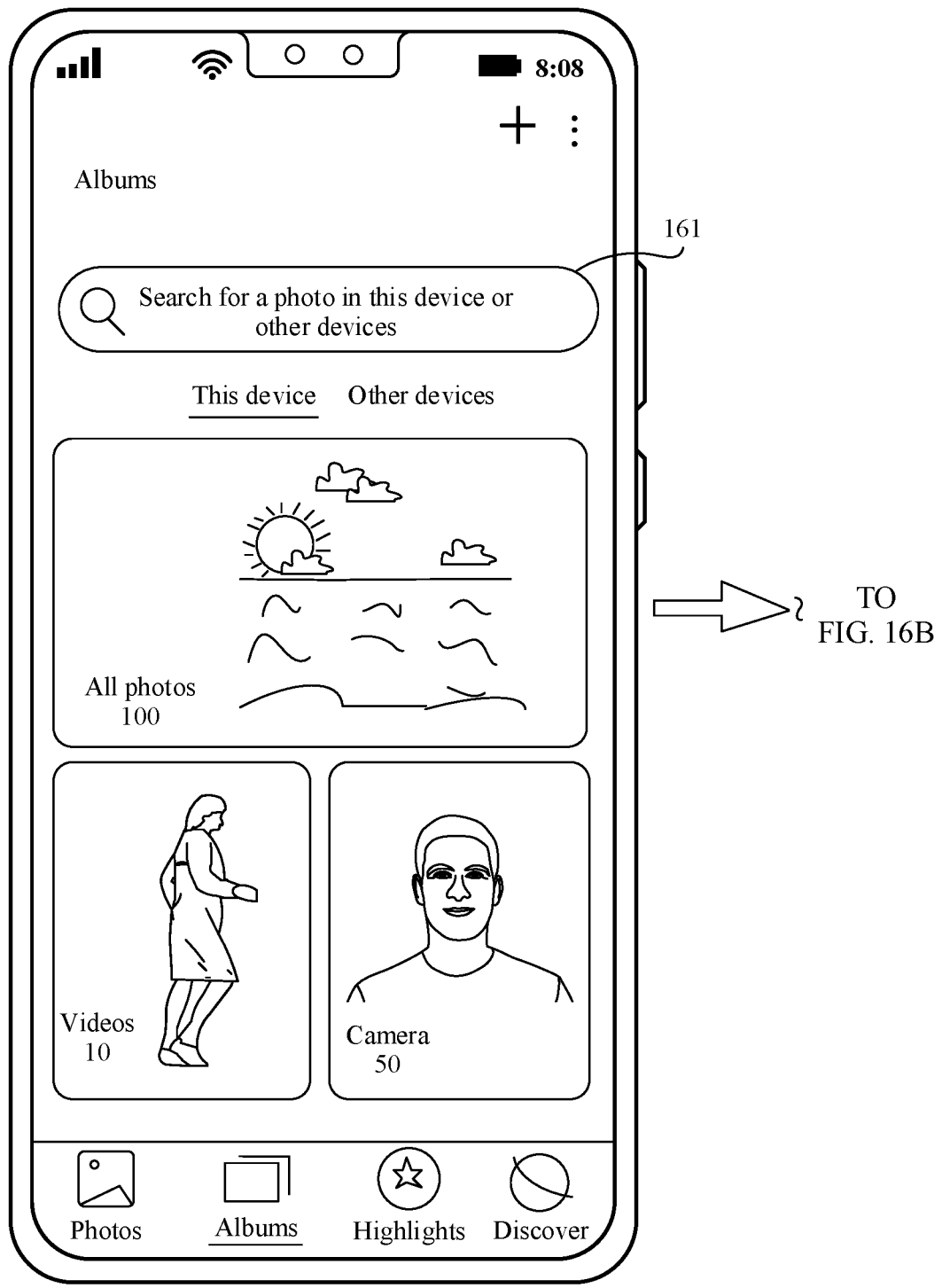
FIG. 16A and FIG. 16B are diagrams of cross-device picture search according to an embodiment of this application.
Figure 16B:
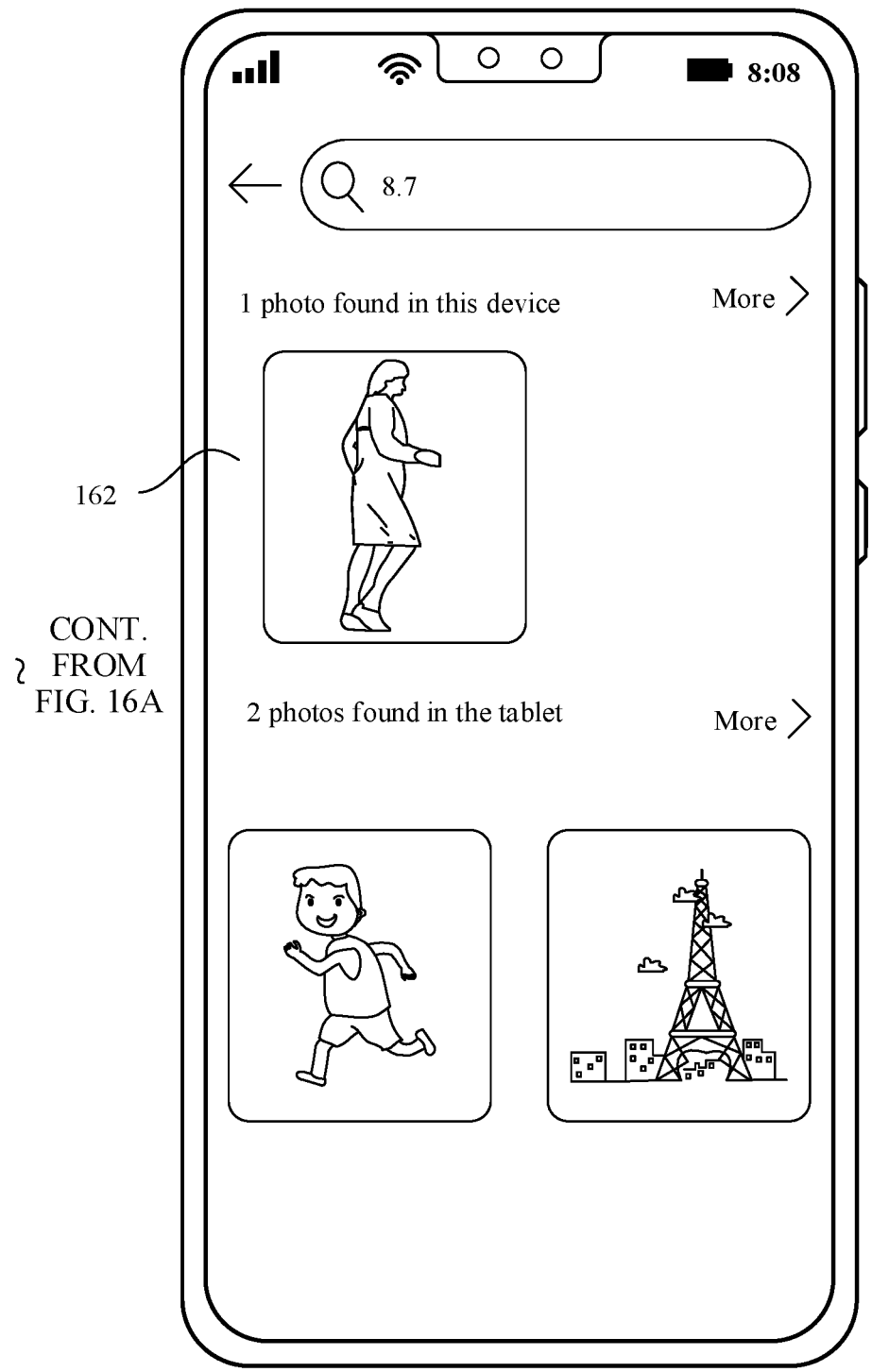

FIG. 16A and FIG. 16B are diagrams of cross-device picture search according to this embodiment of this application. Based on FIG. 15A to FIG. 15E, a camera interface of the mobile phone includes a search box 161, and the user may enter corresponding information in the search box 161 to search for a photo of this device or other devices. For example, the user enters "8.7" in the search box 161 means that the user searches for a photo that is photographed in August 7. After the user finishes entering, the mobile phone displays an interface 162 based on a search result. In this case, the mobile phone finds one photo that meets a search criterion in this device, and finds two photos that meet the search criterion on the tablet.

When the user enters the search criterion in the search box 161, the Gallery initiates a data access request by invoking the unified media library interface. In this case, the data access request does not include a device identifier, that is, data of all devices needs to be queried. Based on the data access request initiated by the Gallery, the data convergence access module on the mobile phone queries the data of this device, the data of the tablet, and the data of the mobile phone 2 in the media library database, to obtain a query result, and returns the query result to the Gallery. After receiving the query result, the Gallery displays the interface 162 based on the query result.

In a cross-device data convergence access solution provided in this embodiment of this application, the first electronic device pre-maps the data of the second electronic device (that is, the peer device) to local storage space, so that access to the data of the second electronic device may be similar to access to the local database. In some embodiments, cross-device data access that is similar to local database access is provided. In addition, when the data of the second electronic device is accessed, a process from initiating an access request to obtaining a query result does not need to involve a process of linking to a remote database, a process of data backhaul of a remote database, or the like. A query speed is not affected by network transmission quality, and time consumed is short, so that performance of cross-device data access is high. In addition, the first electronic device integrates the local data set and the mapping data set of the peer device into one target database, and may query and filter data of a plurality of devices based on one query request, thereby implementing cross-device data convergence access.

Before data convergence access, the data of the second electronic device needs to be synchronized to the first electronic device locally. In some embodiments, the data of the second electronic device may be synchronized to the local storage space of the first electronic device piece by piece. Alternatively, a database or a database table of the second electronic device may be mapped to the first electronic device as a whole through the foregoing data mapping process. Certainly, the data of the second electronic device may further be synchronized to the local storage space of the first electronic device in another manner. In contrast, a manner of mapping a database or a database table to a peer device as a whole reduces time consumed for data synchronization and improves a data availability speed.

When the target database is the virtual database, the data of the second electronic device is mapped locally to the first electronic device through database mapping. When the target database is the intermediate result database, the data of the second electronic device is mapped locally to the first electronic device through table mapping. A process of cross-device data convergence access may vary with a data mapping procedure. The following describes examples of access processes in the two modes with reference to FIG. 17 and FIG. 18.

Figure 17:
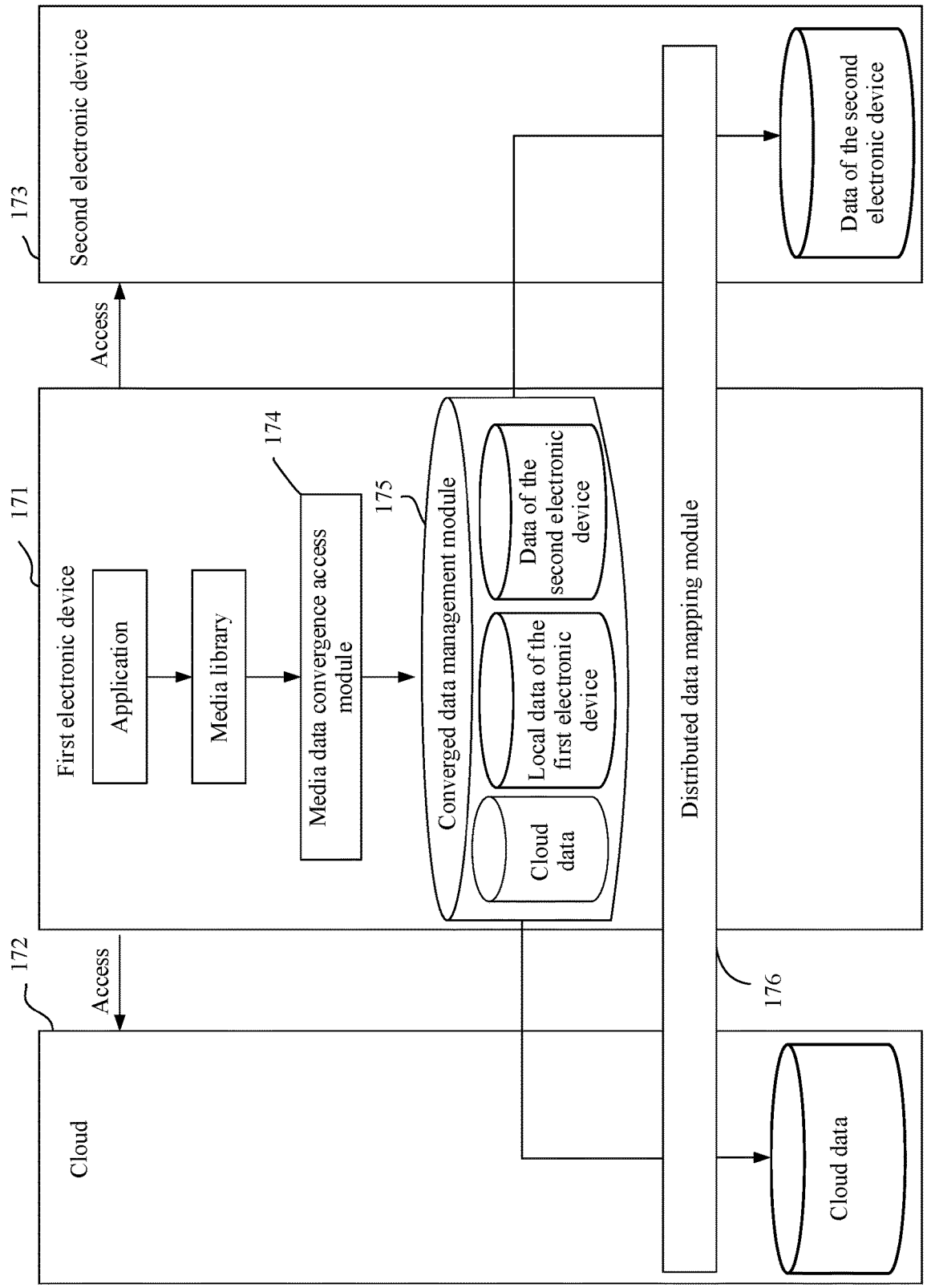
FIG. 17 is a diagram of data convergence access in a database mapping mode according to an embodiment of this application.

FIG. 17 is a diagram of data convergence access in the database mapping mode according to this embodiment of this application. A first electronic device 171 includes a media library, a media data convergence access module 174, and a converged data management module 175.

The media data convergence access module 174 is configured to obtain a data access request of an application, query corresponding media data by using the converged data management module 175 in response to the data access request, and return a query result to the application. A capability of cross-device media data convergence access may be provided by using the media data convergence access module 174.

The converged data management module 175 is configured to manage local data and cross-device data.

A distributed data mapping module 176 is configured to implement mapping and changing of cross-device media data. The distributed data mapping module 176 may be a module in a cross-device distributed database middleware.

By using the distributed data mapping module 176, a cloud 172 and a second electronic device 173 may map a local media database to the first electronic device 171 as a whole. In this case, the cloud 172 may be considered as a special second electronic device.

An application of the first electronic device 171 may initiate a data access request by invoking a media library interface to access media data of the cloud 172 and media data of the second electronic device 173.

Figure 18:
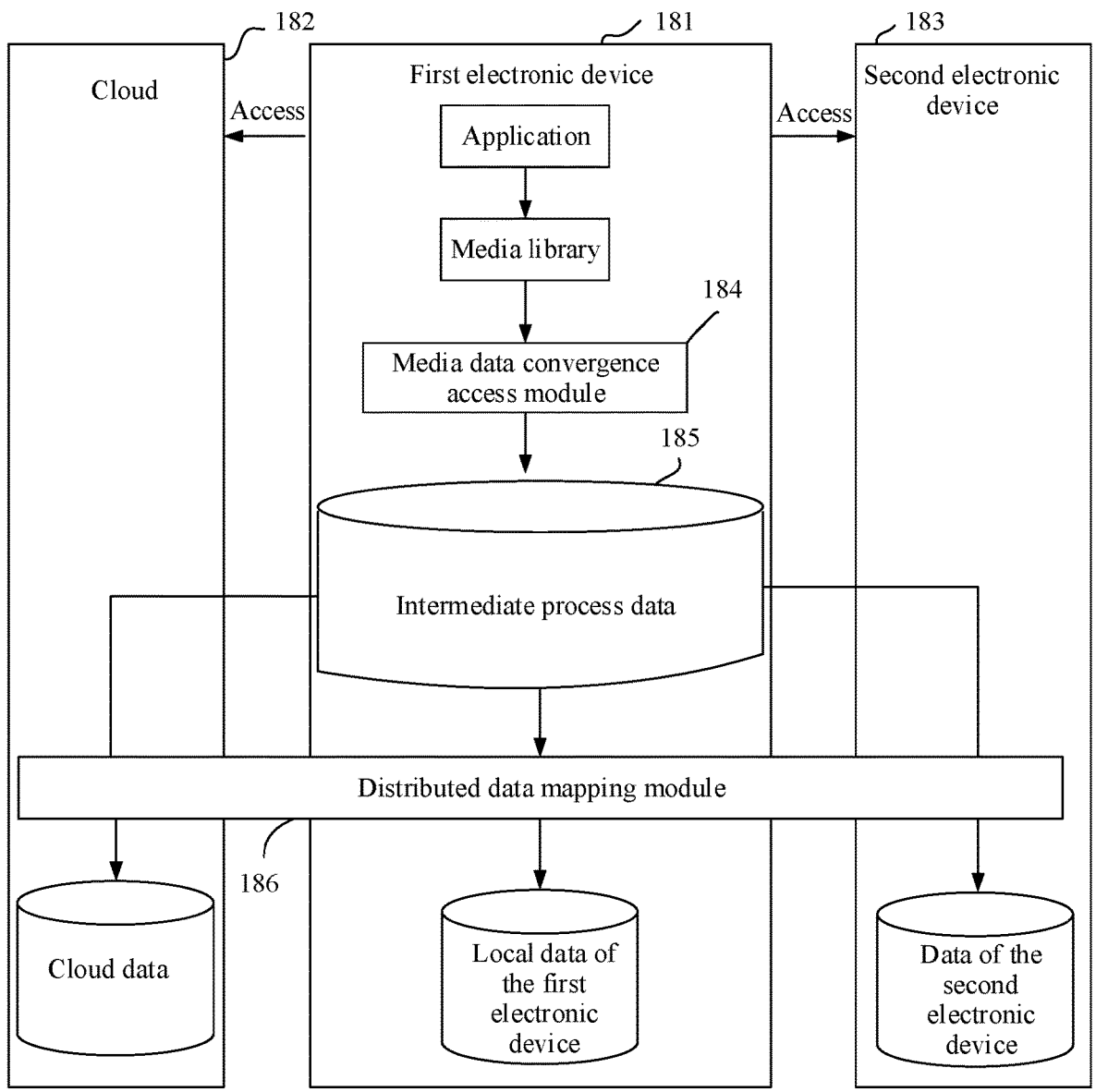
FIG. 18 is a diagram of data convergence access in a table mapping mode according to an embodiment of this application.

FIG. 18 is a diagram of data convergence access in the table mapping mode according to this embodiment of this application. As shown in FIG. 18, a first electronic device 181 may access data of a cloud 182 and data of a second electronic device 183 across devices.

For a media data convergence access module 184 in the first electronic device 181, refer to related content in FIG. 17. Details are not described herein.

A distributed data mapping module 186 is configured to implement mapping and changing of cross-device media data. In this case, the first electronic device 181 creates a mapping table of a local database table by using the distributed data mapping module 186, and loads the mapping table into intermediate process data 185. The cloud 182 and the second electronic device 183 may map the local database table as a whole to the intermediate process data 185 of the first electronic device 181 by using the distributed data mapping module 186.

The intermediate process data 185 may be represented as an intermediate result database, and may include a mapping table of a local database table of the first electronic device 181, a mapping table of a local database table of the cloud 182, and a mapping table of a local database table of the second electronic device 183.

An application on the first electronic device 181 may initiate a data access request by invoking a media library interface. The media data convergence access module 184 queries the intermediate process data 185 in response to the data access request to obtain a query result. If the data access request includes a device identifier of the first electronic device 181, the mapping table of the first electronic device 181 in the intermediate process data 185 is queried. If the data access request includes a device identifier of the cloud 182 or a device identifier of the second electronic device 183, the mapping table of the cloud 182 or the mapping table of the second electronic device 183 in the intermediate process data 185 is queried. If the data access request does not include a device identifier, mapping tables of all devices in the intermediate process data 185 are queried.

In some embodiments, a distributed data mapping module may be configured to implement cross-device data mapping and data change. The distributed data mapping module is a module in the distributed database middleware. The following describes a data mapping process based on the distributed database middleware by using an example.

Figure 19:
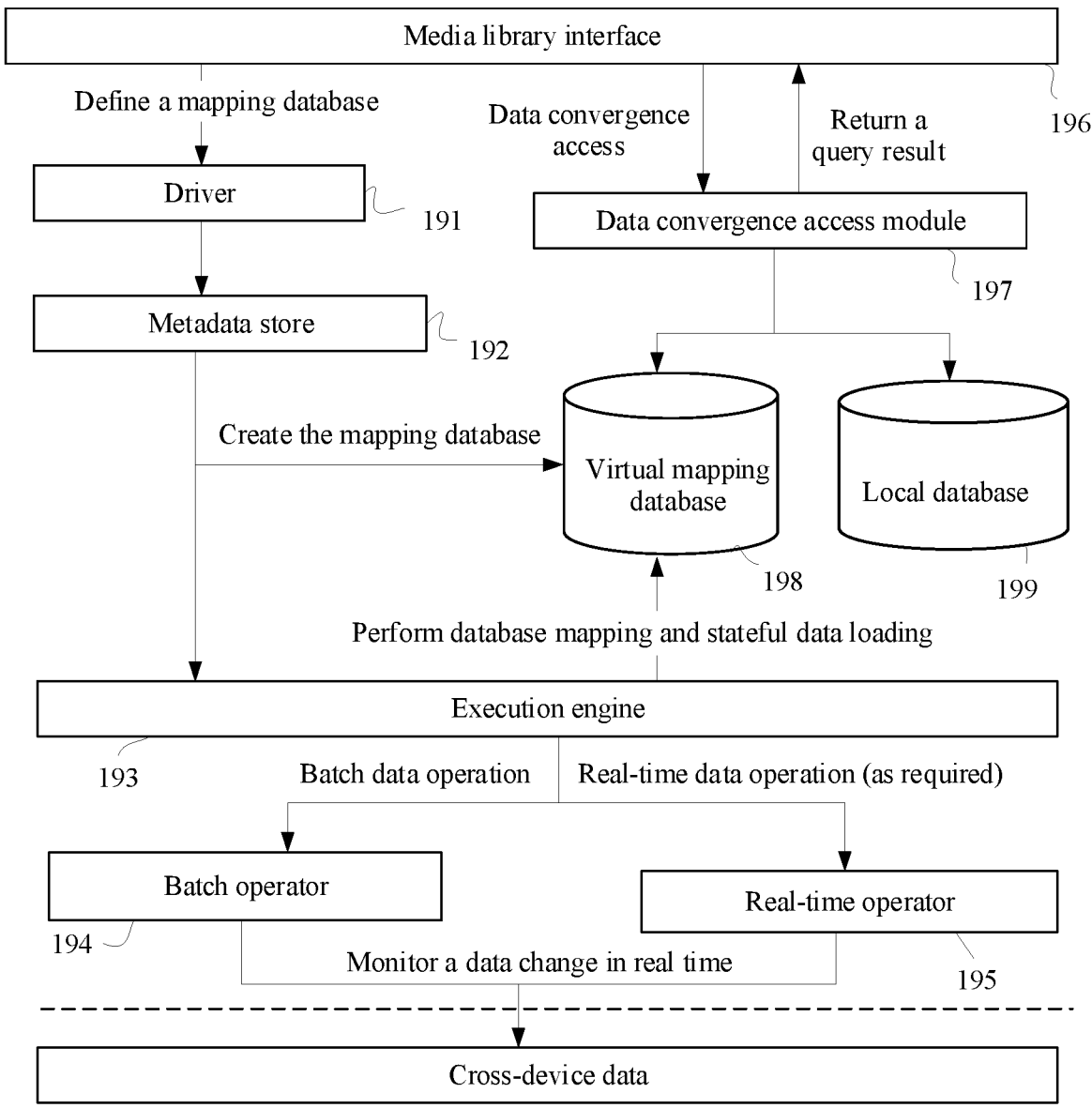
FIG. 19 is a diagram of a database mapping mode based on distributed database middleware according to an embodiment of this application.

FIG. 19 is a diagram of a database mapping mode based on the distributed database middleware according to this embodiment of this application. The distributed database middleware includes the following parts: a driver 191, a metadata store 192, an execution engine 193, a batch operator 194, and a real-time operator 195. The media library includes the following parts: a media library interface 196, a data convergence access module 197, a virtual mapping database 198, and a local database 199.

The database mapping procedure based on the distributed database middleware may include the following operations:

After receiving a device online event, the media library first invokes an interface of the distributed database middleware through the media library interface 196 to create the virtual mapping database 198.

As shown in FIG. 19, the distributed database middleware first defines a mapping database, for example, defines a table included in the mapping database and a database file name, and then creates the mapping database based on the definition of the mapping database. In this case, no data is loaded into the mapping database. Then, the distributed database middleware performs database mapping and stateful data loading. In some embodiments, a data state tree is first created, and then data loading is started based on a data state, and data in the source database is loaded in batches into the pre-created mapping database to obtain a mapping database in which data loading is completed, to obtain the virtual mapping database 198.

For example, refer to FIG. 5. After a media library of the second electronic device 52 receives the device online event of the first electronic device 51, distributed database middleware of the second electronic device 52 defines a mapping database based on database version information of the device online event of the first electronic device 51, and then creates a mapping database based on the definition of the mapping database. Then, the distributed database middleware of the second electronic device 52 creates a data state tree, performs data mapping in the first virtual database to obtain a mapping database 54 in which mapping is completed, and then transmits the mapping database 54 to the first electronic device 51 across devices. In this case, the mapping database 54 on the first electronic device 51 is the virtual mapping database.

After completing cross-device database mapping, the distributed database middleware may further monitor database change information in real time, and load change data of a remote database into the virtual mapping database 198 in real time based on a database monitoring result. As shown in FIG. 19, after monitoring a data change in real time, the real-time operator 195 in the distributed database middleware loads the data change of the remote device in a stateful manner into the virtual mapping database 198.

As shown in FIG. 19, an application may invoke the media library interface 196 to initiate a data convergence access request to the data convergence access module 197. In response to the data convergence access request, the data convergence access module 197 queries the local database 199 and/or the virtual mapping database 198 to obtain a query result, and then returns the query result to the application by using the media library interface 196.

It should be noted that the distributed database middleware is cross-device. Therefore, the procedure of the distributed database middleware shown in FIG. 19 includes procedures of two devices. For example, the procedure of the distributed database middleware shown in FIG. 19 includes a procedure of the first electronic device 51 and a procedure of the second electronic device 52 in FIG. 5.

Figure 20:
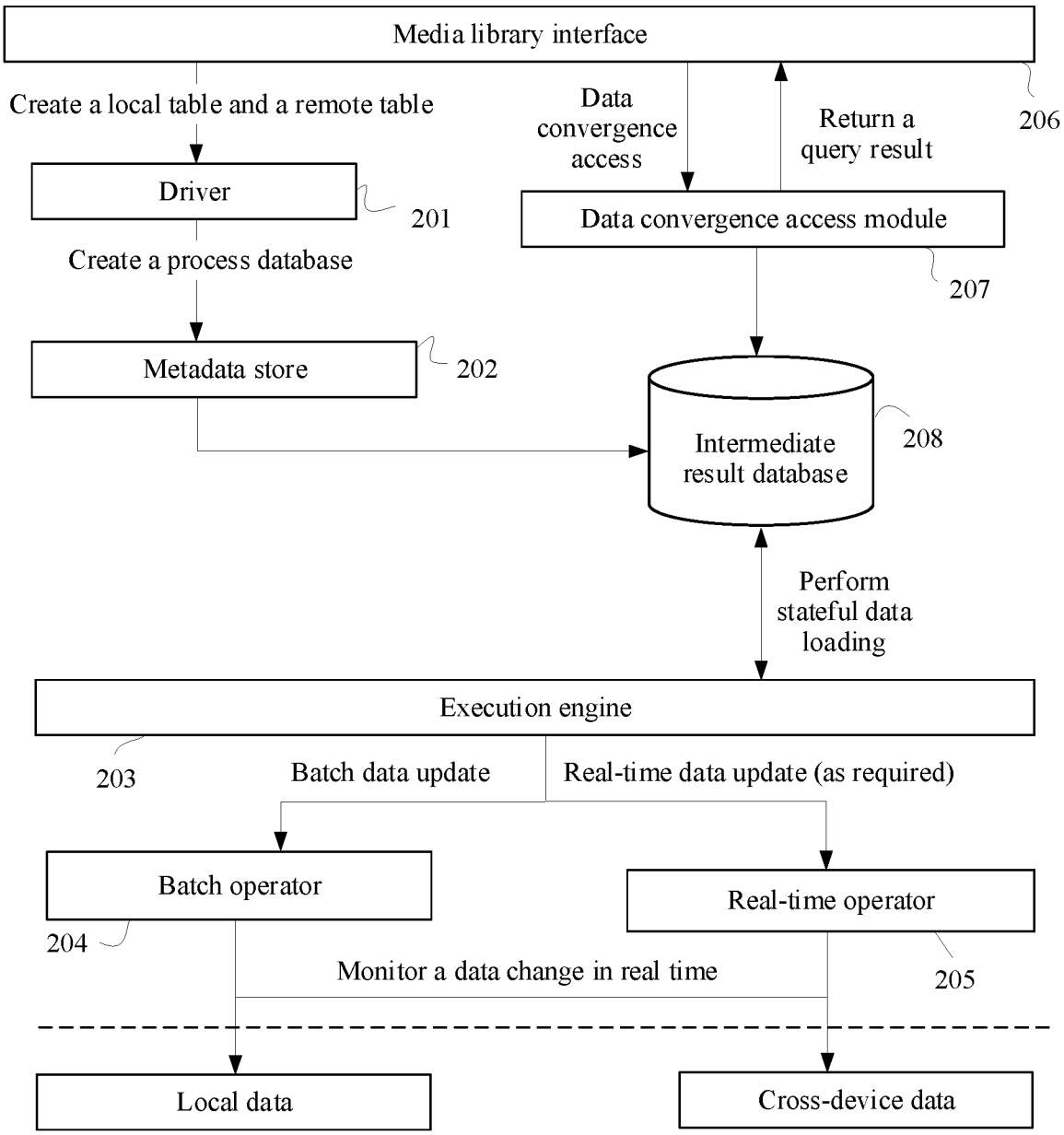
FIG. 20 is a diagram of a table mapping mode based on distributed database middleware according to an embodiment of this application.

FIG. 20 is a diagram of a table mapping mode based on the distributed database middleware according to this embodiment of this application. Similar to FIG. 19, the distributed database middleware includes the following parts: a driver 201, a metadata store 202, an execution engine 203, a batch operator 204, and a real-time operator 205. The media library includes the following parts: a media library interface 206, a data convergence access module 207, and an intermediate result database 208.

The distributed database middleware first creates a local mapping table and a remote mapping table. For example, distributed database middleware of the first electronic device creates a mapping table of a local database table, and distributed database middleware of the second electronic device creates a mapping table of a local database table (that is, the remote mapping table). Then, the distributed database middleware creates an intermediate process database, creates a data state tree, and performs stateful data loading based on the data state tree, that is, loads the local mapping table and the remote mapping table into the intermediate process database in batches to obtain the intermediate result database 208. The remote mapping table needs to be transmitted locally. For example, the second electronic device transmits the created mapping table to the first electronic device.

The distributed database middleware may further monitor a data change in real time. Monitored objects include local data and cross-device data. When a data change is monitored, the distributed database middleware loads change data to the intermediate result database.

As shown in FIG. 20, an application may invoke the media library interface 206 to initiate a data convergence access request to the data convergence access module 207. In response to the data convergence access request, the data convergence access module 207 queries the intermediate result database 208 to obtain a query result, and then returns the query result to the application by using the media library interface 206.

It should be noted that the distributed database middleware is cross-device. Therefore, the procedure of the distributed database middleware shown in FIG. 19 includes procedures of two devices.

It should be noted that the foregoing processes of implementing cross-device data mapping and data change based on the distributed database middleware are merely examples, and do not limit implementation means of cross-device data mapping and data change. For data mapping and data change, refer to the foregoing data mapping process and data change monitoring process. Details are not described herein.

It can be learned from the foregoing that in the data mapping process provided in this embodiment of this application, a database or a database table is mapped to a peer device as a whole, so that database-level or data-table-level data synchronization is implemented. Compared with a data synchronization process in which data is synchronized piece by piece, in this embodiment of this application, time consumed for cross-device data synchronization is reduced, and a data availability speed is improved. In this way, plug-and-play is implemented for a device. In some embodiments, when the device goes online, data of the device may be quickly synchronized to a peer device, so that a data availability speed of the device is higher.

In some embodiments, after the peer device goes offline, the first electronic device may clear a data set of the offline device from a local cache. For example, the first electronic device is a mobile phone, and the second electronic device is a tablet. After a Wi-Fi point-to-point connection is established between the mobile phone and the tablet, and after receiving a mapping database sent by the tablet, the mobile phone locally stores the mapping database of the tablet. After the Wi-Fi point-to-point connection between the mobile phone and the tablet is disconnected, that is, after the tablet goes offline, the mobile phone clears the mapping database of the tablet from a local cache.

Further, to resolve a problem that data mapping fails due to different table structures between different devices during database mapping, this embodiment of this application further provides a different-table-structure mapping solution. In this way, database mapping may still be implemented even if table structures between devices are different, and an application range is wider.

In this embodiment of this application, data state information is further created and recorded during data mapping, whether data changes is monitored based on the data state information, and when the data changes, change data is synchronized to a peer device, to implement cross-device data change monitoring and provide a cross-device real-time data query capability.

In the data convergence access process provided in this embodiment of this application, a database of a peer device is mapped to local storage space in advance, to improve cross-device data convergence access that is similar to local database access, avoid impact of network transmission quality on query performance, and implement high-performance cross-device data convergence access.

It should be understood that sequence numbers of the operations do not mean an execution sequence in the foregoing embodiments. The execution sequence of the processes should be determined based on functions and internal logic of the processes, and should not constitute any limitation on the implementation processes of embodiments of this application.

Corresponding to the data transmission method in the foregoing embodiment, the following describes a data transmission apparatus provided in an embodiment of this application. For ease of description, only a part related to this embodiment of this application is shown.

The data transmission apparatus includes:
a first receiving module, configured to receive a first event from a first electronic device, where the first event includes first database version information, the first database version information describes a database version of a second source database, and the second source database is a local database of the first electronic device;
a first creating module, configured to create a first empty mapping database of a first source database based on the first database version information, where the first source database is a local database of a second electronic device;
a first virtualizing module, configured to virtualize the first source database and the first empty mapping database to obtain a first virtual database;
a first mapping module, configured to perform data mapping in the first virtual database to map data in the first source database to the first empty mapping database, to obtain a first database in which data mapping is completed;
a first obtaining module, configured to obtain a first mapping database based on the first database; and
a first sending module, configured to send the first mapping database to the first electronic device.

In some possible embodiments, the first obtaining module is configured to: compare a database version of the first source database with a database version of the second source database based on the first database version information and second database version information, where the second database version information describes the database version of the first source database; and if the version of the first source database is later than the version of the second source database, perform a version rollback on the first database to obtain the first mapping database, where a version of the first mapping database is consistent with the version of the second source database; or if the version of the first source database is earlier than or equal to the version of the second source database, use the first database as the first mapping database, where a version of the first mapping database is consistent with the version of the first source database.

In some possible embodiments, when the version of the first source database is later than the version of the second source database, a version of the first empty mapping database is consistent with the version of the first source database, and a table structure of the first empty mapping database is consistent with a table structure of the second source database; or when the version of the first source database is earlier than the version of the second source database, a version of the first empty mapping database is consistent with the version of the first source database, and a table structure of the first empty mapping database is consistent with a table structure of the first source database.

In some possible embodiments, the apparatus further includes:
a second sending module, configured to send a second event to the first electronic device, where the second event includes the second database version information; and a second receiving module, configured to receive a second mapping database from the first electronic device, where the second mapping database is a mapping database that is of the second source database and that is created by the first electronic device based on the second database version information.

In some possible embodiments, the apparatus further includes a second virtualizing module, configured to: if the version of the first source database is earlier than the version of the second source database, virtualize the second mapping database and the first source database to obtain a second virtual database; or if the version of the first source database is later than the version of the second source database, upgrade the second mapping database to obtain an upgraded second mapping database, where a version of the upgraded second mapping database is consistent with the version of the first source database; and virtualize the upgraded second mapping database and the first source database to obtain a second virtual database.

In some possible embodiments, the apparatus further includes a first convergence access module, configured to: obtain a first data access request of a first application, where the second electronic device includes the first application; and if the first data access request includes a device identifier of the first electronic device, query the second mapping database in the second virtual database to obtain a first query result, and return the first query result to the first application; if the first data access request does not include a device identifier, query the second mapping database and the first source database in the second virtual database to obtain a second query result, and return the second query result to the first application; or if the first data access request includes a device identifier of the second electronic device, query the first source database in the second virtual database to obtain a third query result, and return the third query result to the first application.

In some possible embodiments, the apparatus further includes:
a first change script receiving module, configured to receive a first change script from the first electronic device, where the first change script includes a table for recording change data of the second source database; and
a first batch update module, configured to: if the version of the first source database is later than the version of the second source database, upgrade the first change script to obtain an upgraded first change script, where a table structure of the upgraded first change script is consistent with the table structure of the first source database; and load the change data of the second source database into the second mapping database by executing the upgraded first change script; or if the version of the first source database is earlier than the version of the second source database, load the change data of the second source database into the second mapping database by executing the first change script.

In some possible embodiments, the apparatus further includes a first update module, configured to: determine, based on a first data state tree, whether the data in the first source database changes, where the first data state tree describes a state of data that is in the first source database and that is mapped to the first empty mapping database; if the data in the first source database changes, record the change data in the first source database in a second change script, where the second change script includes a table for recording change data; and send the second change script to the first electronic device, where when the version of the first source database is later than the version of the second source database, a table structure of the second change script is consistent with the table structure of the second source database; or when the version of the first source database is earlier than the version of the second source database, a table structure of the second change script is consistent with the table structure of the first source database.

In some possible embodiments, the first update module is further configured to update the first data state tree.

It should be noted that content such as information exchange between the foregoing apparatus and modules and an execution process thereof is based on a same concept as method embodiments of this application. For functions and technical effects of the content, refer to the method embodiments. Details are not described herein.

Corresponding to the data transmission method in the foregoing embodiment, the following describes a data transmission apparatus provided in an embodiment of this application. For ease of description, only a part related to this embodiment of this application is shown.

The data transmission apparatus includes:

a third sending module, configured to send a first event to a second electronic device, where the first event includes first database version information, the first database version information describes a database version of a second source database, and the second source database is a local database of the first electronic device; and a third receiving module, configured to receive a first mapping database from the second electronic device, where the first mapping database is a mapping database that is of a first source database and that is created by the second electronic device based on the first database version information, and the first source database is a local database of the second electronic device.

In some possible embodiments, the apparatus further includes a third virtualizing module, configured to: if a version of the first source database is later than the version of the second source database, virtualize the first mapping database and the second source database to obtain a third virtual database; or if a version of the first source database is earlier than the version of the second source database, upgrade the first mapping database to obtain an upgraded first mapping database, where a version of the upgraded first mapping database is consistent with the version of the second source database; and virtualize the upgraded first mapping database and the second source database to obtain a third virtual database.

In some possible embodiments, the apparatus further includes a second convergence access module, configured to: obtain a second data access request of a second application, where the first electronic device includes the second application; and if the second data access request includes a device identifier of the first electronic device, query the second source database in the third virtual database to obtain a fourth query result, and return the fourth query result to the second application; if the second data access request does not include a device identifier, query the first mapping database and the second source database in the third virtual database to obtain a fifth query result, and return the fifth query result to the second application; or if the second data access request includes a device identifier of the second electronic device, query the first mapping database in the third virtual database to obtain a sixth query result, and return the sixth query result to the second application.

In some possible embodiments, the apparatus further includes:

a second change script receiving module, configured to receive a second change script from the second electronic device, where the second change script includes a table for recording change data of the first source database; and a second batch update module, configured to: if the version of the first source database is earlier than the version of the second source database, upgrade the second change script to obtain an upgraded second change script, where a table structure of the upgraded second change script is consistent with a table structure of the second source database; and load the change data of the first source database into the first mapping database by executing the upgraded second change script; or if the version of the first source database is later than the version of the second source database, load the change data of the first source database into the first mapping database by executing the second change script.

In some possible embodiments, the apparatus further includes:

a fourth receiving module, configured to receive a second event from the second electronic device, where the second event includes second database version information, and the second database version information describes a database version of the first source database;

a second creating module, configured to create a second empty mapping database of the second source database based on the second database version information;

a fourth virtualizing module, configured to virtualize the second source database and the second empty mapping database to obtain a fourth virtual database;

a second mapping module, configured to perform data mapping in the fourth virtual database to map data in the second source database to the second empty mapping database, to obtain a second database in which data mapping is completed;

a second obtaining module, configured to obtain a second mapping database based on the second database; and a fourth sending module, configured to send the second mapping database to the second electronic device.

In some possible embodiments, the second obtaining module is configured to: compare a database version of the first source database with a database version of the second source database based on the first database version information and the second database version information; and if the version of the first source database is earlier than or equal to the version of the second source database, perform a version rollback on the second database to obtain the second mapping database, where a version of the second mapping database is consistent with the version of the first source database; or if the version of the first source database is later than the version of the second source database, use the second database as the first mapping database, where a version of the second mapping database is consistent with the version of the second source database.

In some possible embodiments, when the version of the first source database is earlier than the version of the second source database, a version of the second empty mapping database is consistent with the version of the second source database, and a table structure of the second empty mapping database is consistent with a table structure of the first source database; or when the version of the first source database is later than the version of the second source database, a version of the second empty mapping database is consistent with the version of the second source database, and a table structure of the second empty mapping database is consistent with the table structure of the second source database.

In some possible embodiments, the apparatus further includes a second update module, configured to: determine, based on a second data state tree, whether the data in the second source database changes, where the second data state tree describes a state of data that is in the second source database and that is mapped to the second empty mapping database; if the data in the second source database changes, record change data in the second source database in the first change script, where the first change script includes a table for recording change data; update the second data state tree; and send the first change script to the second electronic device.

When the version of the first source database is earlier than the version of the second source database, a table structure of the first change script is consistent with the table structure of the first source database.

When the version of the first source database is later than the version of the second source database, a table structure of the first change script is consistent with the table structure of the second source database.

It should be noted that content such as information exchange between the foregoing apparatus and modules and an execution process thereof is based on a same concept as method embodiments of this application. For functions and technical effects of the content, refer to the method embodiment. Details are not described herein.

Figure 21:
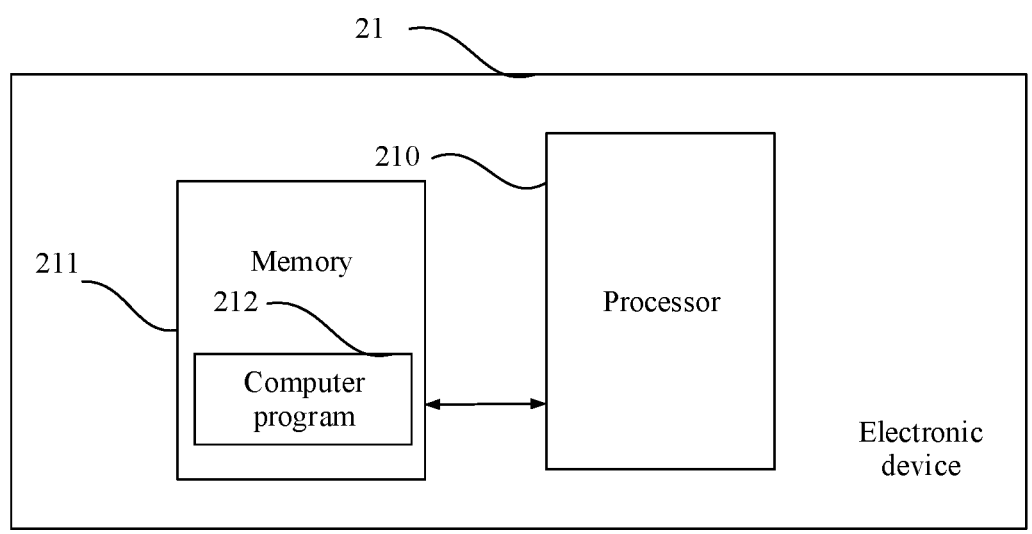
FIG. 21 is a diagram of a structure of an electronic device according to an embodiment of this application.

FIG. 21 is a diagram of a structure of an electronic device according to an embodiment of this application. As shown in FIG. 21, the electronic device 21 in this embodiment includes: at least one processor 210 (only one processor is shown in FIG. 21), a memory 211, and a computer program 212 that is stored in the memory 211 and that may be run on the at least one processor 210. When executing the computer program 212, the processor 210 implements operations in any one of the foregoing method embodiments of data transmission.

The electronic device 21 may be a computing device such as a desktop computer, a notebook computer, a palmtop computer, or a cloud server. The electronic device may include, but is not limited to, the processor 210 and the memory 211. A person skilled in the art may understand that FIG. 21 is merely an example of the electronic device 21, and does not constitute a limitation on the electronic device 21. The electronic device may include more or fewer components than those shown in the figure, or may combine some components, or may use different components. For example, the electronic device may further include an input/output device, a network access device, or the like.

The processor 210 may be a central processing unit (CPU). The processor 210 may alternatively be another general-purpose processor, a digital signal processor (DSP), an application-specific integrated circuit (ASIC), a field-programmable gate array (FPGA), or another programmable logic device, a discrete gate, a transistor logic device, a discrete hardware component, or the like. The general-purpose processor may be a microprocessor, or the processor may be any conventional processor or the like.

In some embodiments, the memory 211 may be an internal storage unit of the electronic device 21, for example, a hard disk or a memory of the electronic device 21. In some other embodiments, the memory 211 may alternatively be an external storage device of the electronic device 21. For example, a plug-in hard disk, a smart media card (SMC), a secure digital (SD) card, a flash card, or the like that is equipped with the electronic device 21. Further, the memory 211 may include both the internal storage unit and the external storage device of the electronic device 21. The memory 211 is configured to store an operating system, an application, a bootloader, data, another program, and the like, for example, program code of a computer program. The memory 211 may be further configured to temporarily store data that has been output or is to be output.

An embodiment of this application further provides a computer-readable storage medium. The computer-readable storage medium stores a computer program. When the computer program is executed by a processor, operations in each of the foregoing method embodiments may be implemented.

An embodiment of this application provides a computer program product. When the computer program product runs on an electronic device, the electronic device is enabled to implement operations in each of the foregoing method embodiments.

An embodiment of this application further provides a chip system. The chip system includes a processor, the processor is coupled to a memory, and the processor executes a computer program stored in the memory, to implement the method in each of the foregoing method embodiments. The chip system may be a single chip or a chip module including a plurality of chips.

In the foregoing embodiments, descriptions of each embodiment have respective focuses. For a part that is not described in detail or recorded in an embodiment, refer to related descriptions in other embodiments. It should be understood that sequence numbers of the operations do not mean an execution sequence in the foregoing embodiments. The execution sequence of the processes should be determined based on functions and internal logic of the processes, and should not constitute any limitation on the implementation processes of embodiments of this application. In addition, in descriptions of this disclosure and claims of this application, terms "first". "second". "third", and the like are merely intended for differentiated description, but shall not be understood as an indication or an implication of relative importance. Reference to "an embodiment". "some embodiments", or the like described in this disclosure of this application indicates that one or more embodiments of this application include a feature, structure, or characteristic described with reference to the embodiments. Therefore, statements such as "in an embodiment". "in some embodiments". "in some other embodiments", and "in other embodiments" that appear at different places in this disclosure do not necessarily mean referring to a same embodiment. Instead, the statements mean "one or more but not all of embodiments", unless otherwise especially emphasized in another manner.

In conclusion, it should be noted that the foregoing descriptions are merely example implementations of this application, but are not intended to limit the protection range of this application. Any variation or replacement within the technical range disclosed in this application shall fall within the protection range of this application. Therefore, the protection range of this application shall be subject to the protection range of the claims.

What is claimed is:

1. A data transmission method, executed by a second electronic device, wherein the method comprises:
   receiving a first event from a first electronic device, wherein the first event comprises first database version information, the first database version information describes a database version of a second source database, and the second source database is a local database of the first electronic device;

creating a first empty mapping database of a first source database based on the first database version information, wherein the first source database is a local database of the second electronic device;

virtualizing the first source database and the first empty mapping database to obtain a first virtual database;

performing data mapping in the first virtual database to map data in the first source database to the first empty mapping database, to obtain a first database in which data mapping is completed;

obtaining a first mapping database based on the first database;

sending the first mapping database to the first electronic device; and receiving, from the first electronic device, a second mapping database for the second electronic device to virtualize the second mapping database and the second source database to obtain a third virtual database, wherein the second electronic device is able to access data of the first electronic device based on the third virtual database.

2. The method according to claim 1, wherein obtaining the first mapping database based on the first database comprises:

comparing a database version of the first source database with the database version of the second source database based on the first database version information and second database version information, wherein the second database version information describes the database version of the first source database; and in response to the version of the first source database being later than the version of the second source database, performing a version rollback on the first database to obtain the first mapping database, wherein a version of the first mapping database is consistent with the version of the second source database; or in response to the version of the first source database being earlier than or equal to the version of the second source database, using the first database as the first mapping database, wherein a version of the first mapping database is consistent with the version of the first source database.

3. The method according to claim 1, wherein when a version of the first source database is later than the version of the second source database, a version of the first empty mapping database is consistent with the version of the first source database, and a table structure of the first empty mapping database is consistent with a table structure of the second source database; or when a version of the first source database is earlier than the version of the second source database, a version of the first empty mapping database is consistent with the version of the first source database, and a table structure of the first empty mapping database is consistent with a table structure of the first source database.

4. The method according to claim 1, wherein the method further comprises:

sending a second event to the first electronic device, wherein the second event comprises second database version information wherein the second mapping database is a mapping database that is of the second source database and that is created by the first electronic device based on the second database version information.

5. The method according to claim 4, wherein after the receiving a second mapping database from the first electronic device, the method further comprises:

either:
in response to the version of the first source database being earlier than the version of the second source database, virtualizing the second mapping database and the first source database to obtain a second virtual database; or in response to the version of the first source database being later than the version of the second source database, upgrading the second mapping database to obtain an upgraded second mapping database, wherein a version of the upgraded second mapping database is consistent with the version of the first source database; and, virtualizing the upgraded second mapping database and the first source database to obtain a second virtual database.

6. The method according to claim 5, wherein after virtualizing the second mapping database and the first source database to obtain a second virtual database, the method further comprises:

obtaining a first data access request of a first application, wherein the second electronic device comprises the first application; and in response to the first data access request comprising a device identifier of the first electronic device, querying the second mapping database in the second virtual database to obtain a first query result, and returning the first query result to the first application;

in response to the first data access request does not comprising a device identifier, querying the second mapping database and the first source database in the second virtual database to obtain a second query result, and returning the second query result to the first application; or in response to the first data access request comprising a device identifier of the second electronic device, querying the first source database in the second virtual database to obtain a third query result, and returning the third query result to the first application.

7. The method according to claim 4, wherein after the receiving the second mapping database from the first electronic device, the method further comprises:

receiving a first change script from the first electronic device, wherein the first change script comprises a table for recording change data of the second source database; and in response to the version of the first source database being later than the version of the second source database, upgrading the first change script to obtain an upgraded first change script, wherein a table structure of the upgraded first change script is consistent with the table structure of the first source database; and loading the change data of the second source database into the second mapping database by executing the upgraded first change script; or in response to the version of the first source database being earlier than the version of the second source database, loading the change data of the second source database into the second mapping database by executing the first change script.

8. The method according to claim 1, wherein the method further comprises:

determining, based on a first data state tree, whether the data in the first source database changes, wherein the first data state tree describes a state of data that is in the first source database and that is mapped to the first empty mapping database;

in response to the data in the first source database changing, recording change data in the first source database in a second change script, wherein the second change script comprises a table for recording change data; and sending the second change script to the first electronic device, wherein when the version of the first source database is later than the version of the second source database, a table structure of the second change script is consistent with the table structure of the second source database; or when the version of the first source database is earlier than the version of the second source database, a table structure of the second change script is consistent with the table structure of the first source database.

9. The method according to claim 8, wherein after determining that the data in the first source database changes, the method further comprises:

updating the first data state tree.

10. An electronic device, comprising a memory, a processor, and executable instructions stored in the memory to be executed by the processor, wherein in response to the processor executing the instructions, the electronic device is to:

receive a first event from a second electronic device, wherein the first event comprises first database version information, the first database version information describes a database version of a second source database, and the second source database is a local database of the second electronic device;

create a first empty mapping database of a first source database based on the first database version information, wherein the first source database is a local database of the electronic device;

virtualize the first source database and the first empty mapping database to obtain a first virtual database;

perform data mapping in the first virtual database to map data in the first source database to the first empty mapping database, to obtain a first database in which data mapping is completed;

obtain a first mapping database based on the first database; and send the first mapping database to the second electronic device, wherein after receiving the first mapping database, the second electronic device virtualizes the first mapping database and the local database to obtain a third virtual database, wherein the second electronic device is able to access data of the electronic device based on the third virtual database.

11. The electronic device of claim 10, wherein obtaining the first mapping database based on the first database comprises:

comparing a database version of the first source database with the database version of the second source database based on the first database version information and second database version information, wherein the second database version information describes the database version of the first source database; and in response to the version of the first source database being later than the version of the second source database, performing a version rollback on the first database to obtain the first mapping database, wherein a version of the first mapping database is consistent with the version of the second source database; or in response to the version of the first source database being earlier than or equal to the version of the second source database, using the first database as the first mapping database, wherein a version of the first mapping database is consistent with the version of the first source database.

12. The electronic device of claim 10, wherein when a version of the first source database is later than the version of the second source database, a version of the first empty mapping database is consistent with the version of the first source database, and a table structure of the first empty mapping database is consistent with a table structure of the second source database; or when a version of the first source database is earlier than the version of the second source database, a version of the first empty mapping database is consistent with the version of the first source database, and a table structure of the first empty mapping database is consistent with a table structure of the first source database.

13. The electronic device of claim 10, wherein the instructions further cause the electronic device to:

send a second event to the second electronic device, wherein the second event comprises second database version information, wherein the second mapping database is a mapping database that is of the second source database and that is created by the second electronic device based on the second database version information.

14. The electronic device of claim 13, wherein after the receiving a second mapping database from the second electronic device, the method instructions further cause the electronic device to:

either:

in response to the version of the first source database being earlier than the version of the second source database, virtualize the second mapping database and the first source database to obtain a second virtual database; or in response to the version of the first source database being later than the version of the second source database, upgrade the second mapping database to obtain an upgraded second mapping database, wherein a version of the upgraded second mapping database is consistent with the version of the first source database; and, virtualize the upgraded second mapping database and the first source database to obtain a second virtual database.

15. A non-transitory computer-readable storage medium, wherein the computer-readable storage medium stores executable instructions therein, and in response to the executable instructions being executed by a processor of a second electronic device, the second electronic device is to:

receive a first event from a first electronic device, wherein the first event comprises first database version information, the first database version information describes a database version of a second source database, and the second source database is a local database of the first electronic device;

create a first empty mapping database of a first source database based on the first database version information, wherein the first source database is a local database of the second electronic device;

virtualize the first source database and the first empty mapping database to obtain a first virtual database;

perform data mapping in the first virtual database to map data in the first source database to the first empty mapping database, to obtain a first database in which data mapping is completed;

obtain a first mapping database based on the first database;

send the first mapping database to the first electronic device; and receive, from the first electronic device, a second mapping database for the second electronic device to virtualize the second mapping database and the second source database to obtain a third virtual database, wherein the second electronic device is able to access data of the first electronic device based on the third virtual database.

16. The non-transitory computer-readable storage medium of claim 15, wherein obtaining the first mapping database based on the first database comprises:

comparing a database version of the first source database with the database version of the second source database based on the first database version information and second database version information, wherein the second database version information describes the database version of the first source database; and in response to the version of the first source database being later than the version of the second source database, performing a version rollback on the first database to obtain the first mapping database, wherein a version of the first mapping database is consistent with the version of the second source database; or in response to the version of the first source database being earlier than or equal to the version of the second source database, using the first database as the first mapping database, wherein a version of the first mapping database is consistent with the version of the first source database.

17. The non-transitory computer-readable storage medium of claim 15, wherein when a version of the first source database is later than the version of the second source database, a version of the first empty mapping database is consistent with the version of the first source database, and a table structure of the first empty mapping database is consistent with a table structure of the second source database; or when a version of the first source database is earlier than the version of the second source database, a version of the first empty mapping database is consistent with the version of the first source database, and a table structure of the first empty mapping database is consistent with a table structure of the first source database.

18. The non-transitory computer-readable storage medium of claim 15, wherein the instructions further cause the second electronic device to:

send a second event to the first electronic device, wherein the second event comprises second database version information; and receive a second mapping database from the first electronic device, wherein the second mapping database is a mapping database that is of the second source database and that is created by the first electronic device based on the second database version information.

19. The non-transitory computer-readable storage medium of claim 18, wherein after the receiving a second mapping database from the first electronic device, the instructions further cause the second electronic device to:

either:
  in response to the version of the first source database being earlier than the version of the second source database, virtualize the second mapping database and the first source database to obtain a second virtual database; or
  in response to the version of the first source database being later than the version of the second source database, upgrade the second mapping database to obtain an upgraded second mapping database, wherein a version of the upgraded second mapping database is consistent with the version of the first source database; and,
virtualizing-virtualize the upgraded second mapping database and the first source database to obtain a second virtual database.

20. The non-transitory computer-readable storage medium of claim 15, wherein after virtualizing second mapping database and the first source database to obtain a second virtual database, the instructions further cause the second electronic device to:

obtain a first data access request of a first application, wherein the second electronic device comprises the first application; and in response to the first data access request comprising a device identifier of the first electronic device, query the second mapping database in the second virtual database to obtain a first query result, and returning the first query result to the first application;

in response to the first data access request does not comprising a device identifier, query the second mapping database and the first source database in the second virtual database to obtain a second query result, and returning the second query result to the first application; or in response to the first data access request comprising a device identifier of the second electronic device, query the first source database in the second virtual database to obtain a third query result, and returning the third query result to the first application.

* * * * *